(12) United States Patent
LeTourneau

(10) Patent No.: US 8,037,102 B2
(45) Date of Patent: Oct. 11, 2011

(54) MANIPULATING SETS OF HIERARCHICAL DATA

(75) Inventor: Jack J. LeTourneau, Santa Barbara, CA (US)

(73) Assignee: Robert T. and Virginia T. Jenkins, Sacramento, CA (US), as Trustees of the Jenkins Family Trust Dated Feb. 8, 2002

( * ) Notice: Subject to any disclaimer, the term of this patent is extended or adjusted under 35 U.S.C. 154(b) by 959 days.

(21) Appl. No.: 11/005,859

(22) Filed: Dec. 6, 2004

(65) Prior Publication Data

US 2005/0187900 A1    Aug. 25, 2005

Related U.S. Application Data

(60) Provisional application No. 60/543,371, filed on Feb. 9, 2004.

(51) Int. Cl.
*G06F 7/00* (2006.01)
(52) U.S. Cl. .................................. 707/797; 707/756
(58) Field of Classification Search ............... 707/736, 707/790, 793, 795, 796, 797, 802, 803, 829
See application file for complete search history.

(56) References Cited

U.S. PATENT DOCUMENTS

| | | | |
|---|---|---|---|
| 3,201,701 A | 8/1965 | Maitra | |
| 4,156,910 A | 5/1979 | Barton et al. | |
| 4,745,561 A | 5/1988 | Hirosawa et al. | |
| 4,751,684 A | 6/1988 | Holt | |
| 4,831,525 A | 5/1989 | Saito et al. | |
| 4,905,138 A | 2/1990 | Bourne | |
| 4,931,928 A | 6/1990 | Greenfeld | |
| 4,949,388 A | 8/1990 | Bhaskaran | |
| 4,989,132 A | 1/1991 | Mellender et al. | |
| 4,991,087 A | 2/1991 | Burkowski et al. | |
| 5,021,943 A | 6/1991 | Grimes | |
| 5,021,992 A | 6/1991 | Kondo | |
| 5,191,522 A | 3/1993 | Bosco et al. | |
| 5,235,701 A | 8/1993 | Ohler et al. | |
| 5,265,245 A | 11/1993 | Nordstrom et al. | |
| 5,295,261 A | 3/1994 | Simonetti | |
| 5,335,345 A | 8/1994 | Frieder et al. | |
| 5,463,777 A | 10/1995 | Bialkowski et al. | |
| 5,493,504 A | 2/1996 | Minato | |
| 5,497,500 A | 3/1996 | Rogers et al. | |
| 5,509,088 A | 4/1996 | Robson | |
| 5,519,627 A | 5/1996 | Mahmood et al. | |
| 5,598,350 A | 1/1997 | Kawanishi et al. | |
| 5,606,669 A | 2/1997 | Bertin et al. | |
| 5,687,362 A | 11/1997 | Bhargava et al. | |
| 5,724,512 A | 3/1998 | Winterbottom | |
| 5,724,576 A | 3/1998 | LeTourneau | |
| 5,758,152 A | 5/1998 | LeTourneau | |

(Continued)

OTHER PUBLICATIONS

Cano et al., Networks, vol. 39(4), pp. 175-185, 2002.*

(Continued)

*Primary Examiner* — Cheyne Ly
(74) *Attorney, Agent, or Firm* — Berkeley Law & Technology Group, LLP

(57) ABSTRACT

Embodiments of methods, apparatuses, devices and/or systems for manipulating hierarchical sets of data are disclosed. In particular embodiments, such hierarchical sets of data may be expressed as trees and/or strings. Further, such trees and/or strings may be associated with numerals. In other particular embodiments, operations on numerals associated with trees may be associated with manipulations of such trees.

30 Claims, 25 Drawing Sheets

| Index | Binary Edge-Labelled Strings | Binary Edge-Labelled Trees |
|---|---|---|
| 0. | $\lambda$ [1] | 0 |
| 1. | < > | 1 |
| 2. | <0> | $\#_0 11$ |
| 3. | <1> | $\#_1 11$ |
| 4. | <0, 0> | $\#_0 1 \#_0 11$ |
| 5. | <0, 1> | $\#_0 \#_0 111$ |
| 6. | <1, 0> | $\#_1 1 \#_0 11$ |
| 7. | <1, 1> | $\#_1 \#_0 111$ |
| 8. | <0, 0, 0> | $\#_0 1 \#_0 1 \#_0 11$ |
| 9. | <0, 0, 1> | $\#_1 1 \#_1 11$ |
| 10. | <0, 1, 0> | $\#_0 \#_0 11 \#_0 11$ |
| 11. | <0, 1, 1> | $\#_0 \#_1 111$ |
| 12. | <1, 0, 0> | $\#_1 1 \#_0 1 \#_0 11$ |
| 13. | <1, 0, 1> | $\#_1 \#_1 111$ |
| 14. | <1, 1, 0> | $\#_1 \#_0 111 \#_0 11$ |
| 15. | <1, 1, 1> | $\#_0 \#_0 11 \#_1 11$ |

[1] The Greek lower-case symbol lambda denotes the empty string.

U.S. PATENT DOCUMENTS

| | | | |
|---|---|---|---|
| 5,781,906 A | 7/1998 | Aggarwal et al. | |
| 5,787,415 A | 7/1998 | Jacobson et al. | |
| 5,787,432 A | 7/1998 | LeTourneau | |
| 5,796,356 A | 8/1998 | Okada et al. | |
| 5,822,593 A | 10/1998 | Lamping et al. | |
| 5,848,159 A | 12/1998 | Collins et al. | |
| 5,930,805 A | 7/1999 | Marquis | |
| 5,978,790 A | 11/1999 | Buneman et al. | |
| 5,999,926 A | 12/1999 | Suciu | |
| 6,002,879 A | 12/1999 | Radigan et al. | |
| 6,055,537 A * | 4/2000 | LeTourneau | 707/101 |
| 6,088,691 A | 7/2000 | Bhargava et al. | |
| 6,141,655 A | 10/2000 | Johnson et al. | |
| 6,199,103 B1 | 3/2001 | Sakaguchi | |
| 6,236,410 B1 | 5/2001 | Politis et al. | |
| 6,289,354 B1 | 9/2001 | Aggarwal et al. | |
| 6,292,938 B1 | 9/2001 | Sarkar et al. | |
| 6,442,584 B1 | 8/2002 | Kolli et al. | |
| 6,542,899 B1 | 4/2003 | Saulpaugh et al. | |
| 6,550,024 B1 | 4/2003 | Pagurek et al. | |
| 6,598,052 B1 | 7/2003 | Saulpaugh et al. | |
| 6,606,632 B1 | 8/2003 | Saulpaugh et al. | |
| 6,609,130 B1 | 8/2003 | Saulpaugh et al. | |
| 6,611,844 B1 | 8/2003 | Saulpaugh et al. | |
| 6,658,649 B1 | 12/2003 | Bates et al. | |
| 6,714,939 B2 | 3/2004 | Saldanha et al. | |
| 6,745,384 B1 | 6/2004 | Biggerstaff | |
| 6,748,378 B1 | 6/2004 | Lavender et al. | |
| 6,763,515 B1 | 7/2004 | Vazquez et al. | |
| 6,785,673 B1 | 8/2004 | Fernandez et al. | |
| 6,847,979 B2 | 1/2005 | Allemang et al. | |
| 6,965,990 B2 | 11/2005 | Barsness et al. | |
| 6,968,330 B2 | 11/2005 | Edwards et al. | |
| 7,051,033 B2 | 5/2006 | Agarwal et al. | |
| 7,072,904 B2 | 7/2006 | Najork et al. | |
| 7,103,838 B1 | 9/2006 | Krishnamurthy et al. | |
| 7,140,006 B2 | 11/2006 | Harrison et al. | |
| 7,162,485 B2 | 1/2007 | Gottlob et al. | |
| 7,191,182 B2 | 3/2007 | Anonsen et al. | |
| 7,203,774 B1 | 4/2007 | Zhou et al. | |
| 7,287,026 B2 | 10/2007 | Oommen | |
| 7,313,563 B2 | 12/2007 | Bordawekar et al. | |
| 7,318,215 B1 | 1/2008 | Krishnan et al. | |
| 7,356,802 B2 | 4/2008 | de Sutter et al. | |
| 7,360,202 B1 | 4/2008 | Seshadri et al. | |
| 7,475,070 B2 | 1/2009 | Fan et al. | |
| 7,512,932 B2 | 3/2009 | Davidov et al. | |
| 7,561,927 B2 | 7/2009 | Oyama et al. | |
| 7,620,632 B2 | 11/2009 | Andrews | |
| 7,627,591 B2 | 12/2009 | LeTourneau | |
| 7,630,995 B2 | 12/2009 | LeTourneau | |
| 7,636,727 B2 | 12/2009 | Schiffmann | |
| 7,681,177 B2 | 3/2010 | LeTourneau | |
| 7,801,923 B2 | 9/2010 | LeTourneau | |
| 7,882,147 B2 | 2/2011 | LeTourneau | |
| 7,899,821 B1 | 3/2011 | Schiffmann | |
| 2001/0003211 A1 | 6/2001 | Bera | |
| 2002/0040292 A1 | 4/2002 | Marcu | |
| 2002/0059281 A1 | 5/2002 | Watanabe et al. | |
| 2002/0062259 A1 | 5/2002 | Katz et al. | |
| 2002/0129129 A1 | 9/2002 | Bloch et al. | |
| 2002/0133497 A1 | 9/2002 | Draper et al. | |
| 2002/0149604 A1 | 10/2002 | Wilkinson | |
| 2002/0169563 A1 | 11/2002 | De Carvalho | |
| 2003/0041088 A1 | 2/2003 | Wilson et al. | |
| 2003/0065659 A1 | 4/2003 | Agarwal et al. | |
| 2003/0115559 A1 | 6/2003 | Sawada | |
| 2003/0130977 A1 | 7/2003 | Oommen | |
| 2003/0167445 A1 | 9/2003 | Su et al. | |
| 2003/0195885 A1 | 10/2003 | Emmick et al. | |
| 2003/0195890 A1 | 10/2003 | Oommen | |
| 2003/0236794 A1 | 12/2003 | Hostetter et al. | |
| 2004/0010752 A1 | 1/2004 | Chan et al. | |
| 2004/0060007 A1 | 3/2004 | Gottlob et al. | |
| 2004/0068498 A1 | 4/2004 | Patchet et al. | |
| 2004/0103105 A1 | 5/2004 | Lindblad et al. | |
| 2004/0205047 A1 | 10/2004 | Carpenter | |
| 2004/0215642 A1 | 10/2004 | Cameron et al. | |
| 2004/0239674 A1 | 12/2004 | Ewald et al. | |
| 2004/0254909 A1 | 12/2004 | Testa | |
| 2004/0260683 A1 | 12/2004 | Chan et al. | |
| 2005/0023524 A1 | 2/2005 | Beatty | |
| 2005/0027743 A1 | 2/2005 | O'Neil et al. | |
| 2005/0050016 A1 | 3/2005 | Stanoi et al. | |
| 2005/0050066 A1 | 3/2005 | Hughes | |
| 2005/0058976 A1 | 3/2005 | Vernon | |
| 2005/0060332 A1 | 3/2005 | Bernstein et al. | |
| 2005/0065964 A1 | 3/2005 | Ziemann et al. | |
| 2005/0125432 A1 | 6/2005 | Lin et al. | |
| 2005/0154979 A1 | 7/2005 | Chidlovskii et al. | |
| 2005/0165732 A1 | 7/2005 | Burges | |
| 2005/0187900 A1 | 8/2005 | LeTourneau | |
| 2005/0267908 A1 | 12/2005 | LeTourneau | |
| 2006/0004817 A1 | 1/2006 | Andrews | |
| 2006/0005122 A1 | 1/2006 | Lemoine | |
| 2006/0015538 A1 | 1/2006 | LeTourneau | |
| 2006/0053122 A1 | 3/2006 | Korn et al. | |
| 2006/0074838 A1 | 4/2006 | Srivastava | |
| 2006/0095442 A1 | 5/2006 | LeTourneau | |
| 2006/0095455 A1 | 5/2006 | LeTourneau | |
| 2006/0123029 A1 | 6/2006 | LeTourneau | |
| 2006/0129582 A1 | 6/2006 | Schiffmann | |
| 2006/0259533 A1 | 11/2006 | LeTourneau | |
| 2006/0271573 A1 | 11/2006 | LeTourneau | |
| 2007/0198538 A1 | 8/2007 | Palacios | |
| 2010/0094885 A1 | 4/2010 | Andrews | |
| 2010/0094908 A1 | 4/2010 | LeTourneau | |
| 2010/0114969 A1 | 5/2010 | LeTourneau | |

OTHER PUBLICATIONS

"Core Technology Benchmarks a White Paper", Jul. 2002, downloaded from the internet Mar. 2, 2004.

"Origin Data, Inc. White Paper", pp. 1-13.

"The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.

"The Associative Model of Data White Paper", Lazy Software, 2000.

Apostol, "A Centennial History of the Prime Number Theorem", Engineering and Science, No. 4, 1996.

Cano et al., "Lazy Evaluation in Penniless Propagation over Join Trees", Networks, vol. 39(4), 175-185, 2002.

Cooper et al., "*Oh! Pascal!*", 1982, pp. 295-327.

Er, M.C., "Enumerating Ordered Trees Lexicographically", Computation Journal, vol. 28, Issue 5, pp. 538-542, 1985.

Hoffman et al., "Pattern Matching in Trees", Jan. 1982, ACM Press, vol. 29, Issue 1, pp. 68-95.

Kharbutli et al., "Using Prime Numbers For Cache Indexing to Eliminate Conflict Misses", 24 pages.

Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.

LeTourneau, "The Elementary Theory of Object Oriented Arithmetic", pp. 1-9, Apr. 1990.

Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.

Sechrest et al., "Blending Hierarchical and Attribute-Based File Naming", Distributed Computing System, 1992., Proceedings of the 12th International Conference on Jun. 9-12, 1992, pp. 572-580.

Shanmugasundaram et al., "Querying SML Views of Relational Data", Proceedings of the 27th VLDB Conference, Roma, Italy, 2001.

Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) 2000.

Smorynski, Craig, "Logical Number Theory I: An Introduction", Springer-Verlag, 1991, pp. 14-23, and 305.

Somani et al., "Phased-Mission System Analysis Using Boolean Algebraic Methods", May 1994, ACM Press, vol. 22, Issue 1.

Stanat, D.F., and McAllister, D.F., "Discrete Mathematics in Computer Science", Prentice-Hall, 1977, Section 3.2, Trees, p. 131-145.
Valiente, "Algorithms on Trees and Graphs", pp. 151-251, Springer 2002.
Valiente, Gabriel, Chapter 4, "Tree Isomorphism," of Algorithms on Trees and Graphs, published by Springer, 2002.
Zaks, S., "Lexicographic Generation of Ordered Trees", The Journal of Theoretical Computer Science, vol. 10(1), pp. 63-82, 1980.
Preliminary Amendment in co-pending U.S. Appl. No. 11/007,139, dated Apr. 28, 2005.
Non-Final OA issued in co-pending pending U.S. Appl. No. 11/007,139, dated May 14, 2007.
Response to Non-Final OA in co-pending U.S. Appl. No. 11/007,139, dated Oct. 15, 2007.
Supplemental Amendment in co-pending U.S. Appl. No. 11/007,139, dated Oct. 17, 2007.
Non-Final OA issued in co-pending U.S. Appl. No. 11/007,139, dated Jan. 2, 2008.
Response to Non-Final OA in co-pending U.S. Appl. No. 11/007,139, dated Apr. 8, 2008.
Office action: Restriction Requirement in co-pending U.S. Appl. No. 11/006,320, dated Mar. 26, 2007
Response to Restriction Requirement in co-pending U.S. Appl. No. 11/006,320, dated Apr. 27, 2007
Notice of Non-Compliant Amendment in co-pending U.S. Appl. No. 11/006,320, dated Jul. 6, 2007.
Response to Notice of Non-Compliant Amendment in co-pending U.S. Appl. No. 11/006,320, dated Jul. 25, 2007.
Non-Final OA issued in co-pending U.S. Appl. No. 11/006,320, dated Oct. 1, 2007.
Response to Non-Final OA in co-pending U.S. Appl. No. 11/006,320, dated Jan. 29, 2008.
Notice of Non-Compliant Amendment in co-pending U.S. Appl. No. 11/006,320, dated Apr. 8, 2008.
Non-Final OA issued in co-pending U.S. Appl. No. 11/006,848, dated Apr. 4, 2007.
Response to Non-Final OA in co-pending U.S. Appl. No. 11/006,848, dated Oct. 3, 2007.
Supplemental Amendment in co-pending U.S. Appl. No. 11/006,848, dated Nov. 13, 2007.
Non-Final OA issued in co-pending U.S. Appl. No. 11/006,848, dated Feb. 5, 2008.
Non-Final OA issued in co-pending U.S. Appl. No. 11/006,841, dated Apr. 6, 2007.
Response to Non-Final OA in co-pending U.S. Appl. No. 11/006,841, dated Sep. 6, 2007.
Office Action: Restriction Requirement in co-pending U.S. Appl. No. 11/006,841, dated Nov. 27, 2007.
Response to Restriction Requirement in co-pending U.S. Appl. No. 11/006,841, dated Dec. 27, 2007.
Office Action: Restriction Requirement in co-pending U.S. Appl. No. 11/006,841, dated Mar. 17, 2008.
Preliminary Amendment in co-pending U.S. Appl. No. 11/006,440, dated Apr. 28, 2005.
Preliminary Amendment and Substitute Specification in co-pending U.S. Appl. No. 11/006,440, dated Oct. 5, 2006.
Office Action: Restriction Requirement in co-pending U.S. Appl. No. 11/006,841, dated Mar. 29, 2007.
Response to Restriction Requirement in co-pending U.S. Appl. No. 11/006,440, dated May 1, 2007.
Non-Final OA issued in co-pending U.S. Appl. No. 11/006,440, dated Jun. 21, 2007.
Response to Non-Final OA in co-pending U.S. Appl. No. 11/006,440, dated Nov. 20, 2007.
Final OA issued in co-pending U.S. Appl. No. 11/006,440, dated Feb. 6, 2008.
Response to Final OA in co-pending U.S. Appl. No. 11/006,440, dated Apr. 7, 2008.
Preliminary Amendment in co-pending U.S. Appl. No. 11/006,446, dated Apr. 28, 2005.
Office Action: Restriction Requirement in co-pending U.S. Appl. No. 11/006,446, dated Apr. 4, 2007.
Response to Restriction Requirement in co-pending U.S. Appl. No. 11/006,446, dated May 3, 2007.
Non-Final OA issued in co-pending U.S. Appl. No. 11/006,446, dated Jul. 26, 2007.
Response to Non-Final OA in co-pending U.S. Appl. No. 11/006,446, dated Nov. 26, 2007.
Non-Final OA issued in co-pending U.S. Appl. No. 11/006,446, dated Feb. 20, 2008.
Office Action: Restriction Requirement in co-pending U.S. Appl. No. 11/006,842, dated Jan. 23, 2008.
Response to Restriction Requirement in co-pending U.S. Appl. No. 11/006,842, dated Feb. 25, 2008.
Office Action: Restriction Requirement in co-pending U.S. Appl. No. 11/412,417, dated Apr. 1, 2008.
Co-pending U.S. Appl. No. 11/319,758, filed Dec. 2005.
Co-pending U.S. Appl. No. 11/320,538, filed Dec. 2005.
Co-pending U.S. Appl. No. 11/480,094, filed Jun. 2006.
Non-Final OA issued in co-pending U.S. Appl. No. 11/385,257, dated Apr. 29, 2008.
Response to Notice of Non-Compliant Amendment in co-pending U.S. Appl. No. 11/006,320, dated May 5, 2008.
Advisory Action issued in co-pending U.S. Appl. No. 11/006,440, dated May 9, 2008.
Preliminary Amendment in co-pending U.S. Appl. No. 11/006,320, dated May 9, 2005.
Preliminary Amendment in co-pending U.S. Appl. No. 11/006,848, dated May 3, 2005.
Johnston et al. Advances in Dataflow Programming Languages, ACM Computing Surveys, vol. 36, No. 1, pp. 1-34, 2004.
Navarro, "A Guided Tour to Approximate String Matching", ACM Computing Surveys, vol. 33, No. 1, pp. 31-88, 2001.
Reiss, "Semantics-Based Code Search", IEEE ICSE, pp. 243-253, 2009.
Talukdar, "Learning to Create Data-Integrating Queries", ACM PVLDB, pp. 785-796, 2008.
Amendment After Final filed Dec. 4, 2009 in U.S. Appl. No. 11/007,139, 25 pages.
Advisory action mailed Dec. 14, 2009 in U.S. Appl. No. 11/007,139, 4 pages.
Amendment After Final filed Nov. 30, 2009 in U.S. Appl. No. 11/006,320, 8 pages.
Office action mailed Dec. 4, 2009 in U.S. Appl. No. 11/006,320, 13 pages.
Issue Notification mailed Oct. 28, 2009 in U.S. Appl. No. 11/006,848, 1 page.
Continuation Patent Application filed Oct. 5, 2009 in co-pending U.S. Appl. No. 12/573,829, 59 pages.
Preliminary Amendment filed Dec. 21, 2009 in co-pending U.S. Appl. No. 12/573,829, 19 pages.
Letter re IDS considered by Examiner mailed Oct. 21, 2009 in U.S. Appl. No. 11/006,841, 5 pages.
Issue Notification mailed Nov. 11, 2009 in U.S. Appl. No. 11/066,841, 1 page.
Continuation Patent Application filed Oct. 13, 2009 in co-pending U.S. Appl. No. 12/578,411, 65 pages.
Letter re IDS considered by Examiner mailed Oct. 21, 2009 in U.S. Appl. No. 11/006,440, 5 pages.
Issue Fee filed Nov. 2, 2009 in U.S. Appl. No. 11/006,440, 12 pages.
Notice of Non-Compliant IDS mailed Nov. 12, 2009 in U.S. Appl. No. 11/006,440, 1 page.
Issue Notification mailed Dec. 2, 2009 in U.S. Appl. No. 11/006,440, 1 page.
Continuation Patent Application and Preliminary Amendment filed Nov. 30, 2009 in co-pending U.S. Appl. No. 12/627,816, 86 pages.
Examiner's Interview Summary mailed Oct. 26, 2009 in U.S. Appl. No. 11/006,446, 4 pages.
Response filed Dec. 7, 2009 in U.S. Appl. No. 11/006,446, 30 pages.
Letter re IDS considered by Examiner mailed Oct. 22, 2009 in U.S. Appl. No. 11/006,842, 4 page.
Issue Fee filed Oct. 27, 2009 in U.S. Appl. No. 11/006,842, 1 page.
Notice of Non-Compliant IDS mailed Nov. 3, 2009 in U.S. Appl. No. 11/006,842, 1 page.

Continuation Patent Application filed Nov. 5, 2009 in co-pending U.S. Appl. No. 12/613,450, 55 pages.
Final Office action mailed Nov. 2, 2009 in U.S. Appl. No. 11/320,538, 20 pages.
Notice of Allowance mailed Dec. 11, 2009 in U.S. Appl. No. 11/361,500, 14 pages.
Examiner's Interview Summary mailed Oct. 30, 2009 in U.S. Appl. No. 11/412,417, 3 pages.
Response filed Oct. 30, 2009 in U.S. Appl. No. 11/412,417, 30 pages.
Request for Continued Examination and Amendment filed Dec. 28, 2009 in U.S. Appl. No. 11/480,094, 36 pages.
ACM Portal Search Results (Kleene and prime and enumeration and operation and natural and numerals and sequences and "enumeration operation") on Jul. 18, 2009, 6 pages.
ACM Portal Search Results (Kleene and prime and enumeration and operation and natural and numerals and sequences and enumeration and operation) on Jul. 18, 2009, 1 page.
Google Search (Kleene prime enumeration operation) on Jul. 18, 2009, 2 pages.
Google search (Kleene prime enumeration operation natural numerals sequences "Kleene prime") on Jul. 18, 2009, 2 pages.
Google Search (Kleene prime enumeration operation natural numerals sequences "enumeration operation") on Jul. 18, 2009, 2 pages.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result on Jul. 18, 2009, 1 page.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
Wu, "A Prime Number Labeling Scheme for Dynamic Ordered XML Trees", IEEE, 2004, 13 pages.
Final Office action mailed Aug. 15, 2008 in co-pending U.S. Appl. No. 11/007,139, 22 pages.
Response filed Oct. 15, 2008 in co-pending U.S. Appl. No. 11/007,139, 23 pages.
Advisory action mailed Oct. 22, 2008 in co-pending U.S. Appl. No. 11/007,139, 26 pages.
RCE and Amendment filed Nov. 14, 2008 in co-pending U.S. Appl. No. 11/007,139, 27 pages.
Office action mailed Dec. 8, 2008 in co-pending U.S. Appl. No. 11/007,139, 17 pages.
Amendment filed May 8, 2009 in co-pending U.S. Appl. No. 11/007,139, 26 pages.
Final Office action mailed Aug. 4, 2009 in co-pending U.S. Appl. No. 11/007,139, 18 pages.
Non-Final OA mailed Aug. 15, 2008 in co-pending U.S. Appl. No. 11/006,320, 19 pages.
Response to Non-Final OA filed Nov. 14, 2008 in co-pending U.S. Appl. No. 11/006,320, 37 pages.
Notice of Non-Compliant Amendment mailed Jan. 27, 2009 in co-pending U.S. Appl. No. 11/006,320, 2 pages.
Amendment filed Apr. 27, 2009 in co-pending U.S. Appl. No. 11/006,320, 39 pages.
Final Office action mailed Jul. 29, 2009 in co-pending U.S. Appl. No. 11/006,320, 7 pages.
Response filed Aug. 4, 2008 in co-pending U.S. Appl. No. 11/006,848, 27 pages.
Final Office action mailed Dec. 2, 2008 in co-pending U.S. Appl. No. 11/006,848, 30 pages.
RCE and Amendment filed May 4, 2009 in co-pending U.S. Appl. No. 11/006,848, 24 pages.
Notice of Allowance mailed Jun. 11, 2009 in co-pending U.S. Appl. No. 11/006,848, 8 pages.
Issue Fee filed Sep. 11, 2009 in co-pending U.S. Appl. No. 11/006,848, 10 pages.
Response to Restriction Requirement filed Jul. 17, 2008 in co-pending U.S. Appl. No. 11/006,841, 33 pages.
Final Office Action, mailed Oct. 29, 2008 in co-pending U.S. Appl. No. 11/006,841, 54 pages.
Response filed Dec. 29, 2008 in co-pending U.S. Appl. No. 11/006,841, 45 pages.
Advisory Action mailed Jan. 6, 2009 in co-pending U.S. Appl. No. 11/006,841, 3 pages.
RCE and Amendment filed Apr. 23, 2009 in co-pending U.S. Appl. No. 11/006,841, 48 pages.
Supplemental Response filed Jun. 26, 2009 in co-pending U.S. Appl. No. 11/006,841, 34 pages.
Notice of Allowance mailed Jun. 29, 2009 in co-pending U.S. Appl. No. 11/006,841, 40 pages.
Issue Fee filed Sep. 29, 2009 in co-pending U.S. Appl. No. 11/006,841, 4 pages.
Notice of Appeal filed Aug. 4, 2008 in co-pending U.S. Appl. No. 11/006,440, 1 page.
Final Office action mailed Jan. 23, 2009 in co-pending U.S. Appl. No. 11/006,440, 22 pages.
RCE and Amendment filed Nov. 4, 2008 in co-pending U.S. Appl. No. 11/006,440, 39 pages.
Amendment After Final filed Apr. 23, 2009 in co-pending U.S. Appl. No. 11/006,440, 34 pages.
Supplemental Amendment filed Jul. 17, 2009 in co-pending U.S. Appl. No. 11/006,440, 29 pages.
Notice of Allowance mailed Jul. 31, 2009 in co-pending U.S. Appl. No. 11/006,440, 15 pages.
Examiner's Amendment and Reasons for Allowance mailed Sep. 30, 2009 in co-pending U.S. Appl. No. 11/006,440, 9 pages.
Response filed Jul. 21, 2008 in co-pending U.S. Appl. No. 11/006,446, 29 pages.
Final Office action mailed Oct. 28, 2008 in co-pending U.S. Appl. No. 11/006,446, 40 pages.
Response filed Dec. 29, 2008 in co-pending U.S. Appl. No. 11/006,446, 30 pages.
Advisory action mailed Jan. 7, 2009 in co-pending U.S. Appl. No. 11/006,446, 3 pages.
RCE and Amendment filed Apr. 28, 2009 in co-pending U.S. Appl. No. 11/006,446, 33 pages.
Office action mailed Jul. 7, 2009 in co-pending U.S. Appl. No. 11/006,446, 32 pages.
Amendment filed Jul. 29, 2008 in co-pending U.S. Appl. No. 11/385,257, 26 pages.
Final Office action mailed Dec. 9, 2008 in co-pending U.S. Appl. No. 11/385,257, 35 pages.
RCE and Amendment filed May 11, 2009 in co-pending U.S. Appl. No. 11/385,257, 33 pages.
Supplemental Response filed May 26, 2009, in co-pending U.S. Appl. No. 11/385,257, 3 pages.
Notice of Non-Compliant Amendment mailed Jun. 1, 2009 in co-pending U.S. Appl. No. 11/385,257, 3 pages.
Response filed Jun. 30, 2009 in co-pending U.S. Appl. No. 11/385,257, 31 pages.
Office action mailed Sep. 14, 2009 in co-pending U.S. Appl. No. 11/385,257, 37 pages.
Office action mailed Nov. 12, 2008 in co-pending U.S. Appl. No. 11/319,758, 30 pages.
Amendment filed May 12, 2009 in co-pending U.S. Appl. No. 11/319,758, 35 pages.
Final Office action mailed Aug. 3, 2009 in co-pending U.S. Appl. No. 11/319,758, 35 pages.
Office action: Restriction Requirement mailed May 13, 2008 in co-pending U.S. Appl. No. 11/006,842, 5 pages.
Response to Restriction Requirement filed Aug. 13, 2008 in co-pending U.S. Appl. No. 11/006,842, 24 pages.
Office action mailed Nov. 3, 2008 in co-pending U.S. Appl. No. 11/006,842, 21 pages.
Response filed May 4, 2009 in co-pending U.S. Appl. No. 11/006,842, 35 pages.
Supplemental Response filed Jul. 17, 2009 in co-pending U.S. Appl. No. 11/006,842, 23 pages.
Notice of Allowance mailed Jul. 27, 2009 in co-pending U.S. Appl. No. 11/006,842, 13 pages.

Office action mailed Apr. 1, 2009 in co-pending Patent Application No. 11/320,538, 18 pages.
Response filed Jul. 1, 2009 in co-pending U.S. Appl. No. 11/320,538, 26 pages.
Office action mailed May 27, 2009 in co-pending U.S. Appl. No. 11/361,500, 24 pages.
Response filed Aug. 27, 2009 in co-pending U.S. Appl. No. 11/361,500, 36 pages.
Amendment filed Aug. 1, 2008 in co-pending U.S. Appl. No. 11/412,417, 27 pages.
Final Office action mailed Nov. 13, 2008 in co-pending U.S. Appl. No. 11/412,417, 34 pages.
RCE and Amendment filed May 12, 2009 in co-pending U.S. Appl. No. 11/412,417, 31 pages.
Office action mailed Jun. 30, 2009 in co-pending U.S. Appl. No. 11/412,417, 34 pages.
Office action mailed Nov. 7, 2008 in co-pending U.S. Appl. No. 11/480,094, 19 pages.
Amendment filed May 7, 2009 in co-pending U.S. Appl. No. 11/480,094, 33 pages.
Final Office action mailed Jul. 28, 2009 in co-pending U.S. Appl. No. 11/480,094, 12 pages.
U.S. Appl. No. 11/385,257: Response to Non-Final Office Action filed Jan. 13, 2010, 34 pages.
U.S. Appl. No. 11/385,257: Final Office Action mailed Apr. 12, 2010, 47 pages.
U.S. Appl. No. 11/319,758: RCE filed Jan. 4, 2010, 45 pages.
U.S. Appl. No. 11/319,758: Non-Final Office Action mailed Mar. 30, 2010, 39 pages.
U.S. Appl. No. 12/613,450: Notice of Missing Parts mailed Nov. 18, 2009, 2 pages.
U.S. Appl. No. 12/613,450: Preliminary Amendment and Response to Missing Parts filed Jan. 19, 2010, 16 pages.
U.S. Appl. No. 11/320,538: Response to Final Office Action filed Jan. 4, 2010, 23 pages.
U.S. Appl. No. 11/320,538: Advisory Action mailed Jan. 19, 2010, 3 pages.
U.S. Appl. No. 11/320,538: RCE and Amendment filed Apr. 2, 2010, 26 pages.
U.S. Appl. No. 11/320,538: Non-Final Office Action mailed Jun. 9, 2010, 24 pages.
U.S. Appl. No. 12/702,243: Continuation Application with Preliminary Amendment filed Feb. 8, 2010, 83 pages.
U.S. Appl. No. 12/702,243: Notice of Missing Parts mailed Feb. 25, 2010, 2 pages.
U.S. Appl. No. 12/702,243: Response to Missing Parts filed Apr. 26, 2010, 8 pages.
U.S. Appl. No. 11/412,417: Final Office Action mailed Jan. 4, 2010, 37 pages.
U.S. Appl. No. 11/412,417: RCE with Amendment filed May 4, 2010, 27 pages.
U.S. Appl. No. 11/007,139: RCE with amendment filed Jan. 4, 2010, 27 pages.
U.S. Appl. No. 11/007,139: Non-Final Office Action mailed Jan. 27, 2010, 31 pages.
U.S. Appl. No. 11/007,139: Response to Non-Final Office Action filed Apr. 27, 2010, 30 pages.
U.S. Appl. No. 11/006,320: Response to Non-Final Office Action filed Feb. 23, 2010, 11 pages.
U.S. Appl. No. 11/006,320: Final Office Action mailed May 24, 2010, 11 pages.
U.S. Appl. No. 12/573,829: Notice of Publication mailed Apr. 15, 2010, 1 page.
U.S. Appl. No. 12/573,829: Examiner's Search Strategy and Results dated Jun. 11, 2009, 1 page.
U.S. Appl. No. 12/573,829: Non-Final Office Action mailed Jun. 28, 2010 with Examiner Search Strategy and Results, 103 pages.
U.S. Appl. No. 12/578,411: Notice of Missing Parts mailed Oct. 28, 2009, 2 pages.
U.S. Appl. No. 12/578,411: Response to Missing Parts filed Dec. 28, 2009, 25 pages.
U.S. Appl. No. 12/578,411: Notice of Publication mailed Apr. 15, 2010, 1 page.
U.S. Appl. No. 12/627,816: Notice of Missing Parts mailed Dec. 15, 2009, 2 pages.
U.S. Appl. No. 12/627,816: Response to Missing Parts filed Apr. 12, 2010, 21 pages.
U.S. Appl. No. 11/006,446: Examiner Interview Summary mailed Mar. 19, 2010, 4 pages.
U.S. Appl. No.11/006,446: Notice of Allowance/Allowability mailed Mar. 19, 2010, 29 pages.
U.S. Appl. No. 11/006,446: Issue Fee Payment and 312 Amendment filed Jun. 21, 2010, 23 pages.
U.S. Appl. No. 12/830,236: Divisional Application filed Jul. 2, 2010, 103 pages.
U.S. Appl. No. 11/319,758, filed Dec. 27, 2005, Schiffmann.
U.S. Appl. No. 11/320,538, filed Dec. 27, 2005, LeTourneau, J.J.
U.S. Appl. No. 11/412,417, filed Apr. 26, 2006, Schiffmann.
U.S. Appl. No. 11/480,094, filed Apr. 26, 2006, LeTourneau, J.J.
U.S. Appl. No. 12/627,816, filed Nov. 30, 2009, Schiffmann.
U.S. Appl. No. 12/702,243, filed Feb. 8, 2010, LeTourneau, J.J.
U.S. Appl. No. 12/830,236, filed Jul. 2, 2010, LeTourneau, J.J.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Dubiner, M., Galil, Z., and Magen, E. "Faster Tree Pattern Matching.", Journal of the Association for Computing Machinery, vol. 41, No. 2, Mar. 1994, pp. 205-213.
Ramesh, R. and Ramakrishnan, I.V., "Nonlinear Pattern Matching in Trees." Journal of the Association for Computer Machiney, vol. 39, No. 2, Apr. 1992, pp. 295-316.
Durango Bill's Enumeration of Trees. http://web.archive.org/web/20021028184112/http://www.durangobill.com/Trees.html, 1998.
Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.
U.S. Appl. No. 11/007,139: Application filed Dec. 7, 2004, 90 pages.
U.S. Appl. No. 11/007,139: Notice to File Missing Parts mailed Jan. 19, 2005, 2 pages.
U.S. Appl. No. 11/007,139: Response to Notice to File Missing Parts mailed Apr. 1, 2005, 9 pages.
U.S. Appl. No. 11/007,139: Office Action mailed Jul. 20, 2010, 20 pages.
U.S. Appl. No. 11/007,139: Office Action response mailed Oct. 20, 2010, 33 pages.
U.S. Appl. No. 11/007,139: Advisory Action mailed Oct. 25, 2010, 2 pages.
U.S. Appl. No. 11/007,139: Office Action response mailed Nov. 18, 2010, 24 pages.
U.S. Appl. No. 11/007,139: Advisory Action mailed Dec. 1, 2010, 4 pages.
U.S. Appl. No. 11/007,139: Office Action response and Notice of Appeal mailed Dec. 20, 2010, 29 pages.
U.S. Appl. No. 11/007,139: Office Action mailed Jan. 3, 2011, 24 pages.
U.S. Appl. No. 11/007,139: Office Action response, mailed May 3, 2011, 27 pages.
U.S. Appl. No. 11/006,320: Application filed Dec. 6, 2004, 75 pages.
U.S. Appl. No. 11/006,320: Office Action response mailed Aug. 24, 2010, 15 pages.
U.S. Appl. No. 11/006,320: Notice of Allowance mailed Sep. 17, 2010, 8 pages.
U.S. Appl. No. 11/006,320: Examiner Interview Summary and supplemental Notice of Allowance mailed Dec. 17, 2010, 9 pages.
U.S. Appl. No. 11/006,320: Rule 312 Amendment and Issue Fee payment mailed Dec. 17, 2010, 10 pages.
U.S. Appl. No. 11/006,320: Issue Notification mailed Jan. 12, 2011, 1 page.
U.S. Appl. No. 12/972,326: Application as filed on Dec. 17, 2010, 74 pages.
U.S. Appl. No. 12/972,326: Filing receipt and Notice to File Missing Parts mailed Jan. 6, 2011, 5 pages.

U.S. Appl. No. 12/972,326: Response to Notice to File Missing parts mailed Jan. 26, 2011, 14 pages.
U.S. Appl. No. 12/972,326: Filing Receipt, mailed Feb. 18, 2011, 3 pages.
U.S. Appl. No. 12/972,326: Preliminary amendment mailed May 20, 2011, 15 pages.
U.S. Appl. No. 13/014,677: Application as filed on Jan. 26, 2011.
U.S. Appl. No. 13/014,677: Notice to file missing parts and filing receipt, mailed Mar. 23, 2011, 5 pages.
U.S. Appl. No. 11/006,848: Application as filed Dec. 7, 2004, 59 pages.
U.S. Appl. No. 11/006,848: Notice to File Missing Parts mailed Mar. 18, 2005, 2 pages.
U.S. Appl. No. 11/006,848: Response to Notice to File Missing Parts mailed May 3, 2005, 101 pages.
U.S. Appl. No. 12/573,829: Notice to File Missing Parts and Filing Receipt mailed Oct. 20, 2009, 5 pages.
U.S. Appl. No. 12/573,829: Filing receipt mailed Jan. 4, 2010.
U.S. Appl. No. 12/573,829: Office Action Response mailed Sep. 28, 2010, 22 pages.
U.S. Appl. No. 12/573,829: Office Action mailed Nov. 1, 2010, 29 pages.
U.S. Appl. No. 12/573,829: Office Action Response mailed Jan. 3, 2011, 29 pages.
U.S. Appl. No. 12/573,829: Advisory Action mailed Jan. 7, 2011, 3 pages.
U.S. Appl. No. 12/573,829: Notice of Appeal mailed Jan. 11, 2011, 1 page.
U.S. Appl. No. 12/573,829: Appeal Brief, mailed May 4, 2011, 68 pages.
U.S. Appl. No. 11/006,841: Application as filed on Dec. 7, 2004, 63 pages.
U.S. Appl. No. 11/006,841: Notice to file missing parts mailed Jan. 10, 2005, 2 pages.
U.S. Appl. No. 11/006,841: Response to Notice to file missing parts and preliminary amendment mailed Apr. 14, 2005, 105 pages.
U.S. Appl. No. 12/578,411: Filing Receipt mailed Jan. 7, 2010, 3 pages.
U.S. Appl. No. 11/006,440: Application as filed on Dec. 6, 2004, 85 pages.
U.S. Appl. No. 11/006,440: Notice to file missing parts Jan. 11, 2005, 2 pages.
U.S. Appl. No. 11/006,440: Response to Notice to file missing parts mailed Mar. 15, 2005, 8 pages.
U.S. Appl. No. 12/627,816: Filing Receipt mailed Apr. 20, 2010, 3 pages.
U.S. Appl. No. 12/627,816: Notice of Publication mailed Jul. 29, 2010, 1 page.
U.S. Appl. No. 12/627,816: Non-Final OA, mailed May 5, 2011, 19 pages.
U.S. Appl. No. 11/006,446: Application filed Dec. 6, 2004, 91 pages.
U.S. Appl. No. 11/006,446: Notice of Missing Parts mailed Jan. 24, 2005, 3 pages.
U.S. Appl. No. 11/006,446: Response to Notice to File Missing Parts mailed Mar. 29, 2005, 8 pages.
U.S. Appl. No. 11/006,446: Examiner Interview Summary mailed Mar. 19, 2010, 4 pages.
U.S. Appl. No. 11/006,446: Rule 312 Amendment mailed Aug. 19, 2010, 2 pages.
U.S. Appl. No. 11/006,446: Formal drawings mailed Aug. 25, 2010, 29 pages.
U.S. Appl. No. 11/006,446: Issue Notification mailed Sep. 1, 2010, 1 page.
U.S. Appl. No. 12/830,236: Notice to File Corrected Application Papers mailed Jul. 16, 2010, 5 pages.
U.S. Appl. No. 12/830,236: Response to Notice to File Corrected Application Papers mailed Aug. 25, 2010, 32 pages.
U.S. Appl. No. 12/830,236: Filing receipt mailed Sep. 3, 2010, 3 pages.
U.S. Appl. No. 12/830,236: Notice of Publication mailed Dec. 16, 2010, 1 page.
U.S. Appl. No. 12/830,236: Restriciton requirement mailed Mar. 18, 2011, 6 pages.
U.S. Appl. No. 12/830,236: Restriciton requirement response, mailed Apr. 18, 2011, 5 pages.
U.S. Appl. No. 12/830,236: Non-Final Office Action, mailed May 11, 2011, 10 pages.
U.S. Appl. No. 11/385,257: Application filed Mar. 20, 2006, 118 pages.
U.S. Appl. No. 11/385,257: Notice of Missing Parts mailed May 3, 2006, 2 pages.
U.S. Appl. No. 11/385,257: Response to Missing Parts filed Aug. 3, 2006, 46 pages.
U.S. Appl. No. 11/385,257: Notice of Publication mailed Nov. 30, 2006, 1 page.
U.S. Appl. No. 11/385,257: RCE mailed Aug. 12, 2010, 35 pages.
U.S. Appl. No. 11/385,257: Office Action mailed Sep. 30, 2010, 39 pages.
U.S. Appl. No. 11/385,257: Office Action response, mailed Mar. 29, 2011, 31 pages.
U.S. Appl. No. 11/385,257: Final Rejection mailed Jun. 1, 2011, 40 pages.
U.S. Appl. No. 11/319,758: Notice of Missing Parts mailed Feb. 1, 2006, 2 pages.
U.S. Appl. No. 11/319,758: Response to Missing Parts filed Jul. 3, 2006, 15 pages.
U.S. Appl. No. 11/319,758: Office Action response mailed Jul. 29, 2010, 30 pages.
U.S. Appl. No. 11/319,758: Final Office Action mailed Oct. 28, 2010, 31 pages.
U.S. Appl. No. 11/319,758: Request for Continued Examination, mailed Mar. 28, 2011, 32 pages.
U.S. Appl. No. 11/006,842: Application as filed on Dec. 7, 2004, 58 pages.
U.S. Appl. No. 11/006,842: Notice to file missing parts Jan. 10, 2005, 2 pages.
U.S. Appl. No. 11/006,842: Response to Notice to file missing parts mailed Apr. 1, 2005.
U.S. Appl. No. 11/006,842: Preliminary Amendment mailed May 2, 2005, 93 pages.
U.S. Appl. No. 11/006,842: Issue notification mailed Nov. 18, 2009, 1 page.
U.S. Appl. No. 12/613,450: Filing receipt mailed Jan. 27, 2010, 3 pages.
U.S. Appl. No. 12/613,450: Notice of Publication mailed May 6, 2010, 1 page.
U.S. Appl. No. 11/320,538: Notice of Missing Parts mailed Feb. 2, 2006, 2 pages.
U.S. Appl. No. 11/320,538: Response to Missing Parts filed Aug. 2, 2006, 36 pages.
U.S. Appl. No. 11/320,538: Office action mailed Dec. 22, 2010, 10 pages.
U.S. Appl. No. 11/320, 538: Notice of Appeal, mailed May 23, 2011, 6 pages.
U.S. Appl. No. 11/361,500: Application as filed on Feb. 23, 2006, 72 pages.
U.S. Appl. No. 11/361,500: Notice to file missing parts mailed Mar. 23, 2006, 2 pages.
U.S. Appl. No. 11/361,500: Response to Notice to File Missing Parts mailed Jul. 19, 2006, 27 pages.
U.S. Appl. No. 11/361,500: Notice of Publication mailed Nov. 16, 2006, 1 page.
U.S. Appl. No. 11/361,500: Issue Fee Payment and Rule 312 Amendment mailed Jan. 6, 2010.
U.S. Appl. No. 11/361,500: Response to Rule 312 Amendment Jan. 25, 2010, 4 pages.
U.S. Appl. No. 11/361,500: Issue Notification mailed Feb. 24, 2010, 1 page.
U.S. Appl. No. 12/702,243: Filing receipt mailed May 4, 2010, 3 pages.
U.S. Appl. No. 12/702,243: Notice of Publication mailed Aug. 12, 2010, 1 page.
U.S. Appl. No. 11/412,417: Application filed Apr. 26, 2006, 96 pages.
U.S. Appl. No. 11/412,417: Notice of Missing Parts mailed May 19, 2006, 2 pages.

U.S. Appl. No. 11/412,417: Response to Notice of Missing Parts filed Jul. 19, 2006, 14 pages.
U.S. Appl. No. 11/412,417: Examiner Interview Summary mailed Oct. 30, 2009, 3 pages.
U.S. Appl. No. 11/412,417: Supplemental Office Action Response mailed Jun. 22, 2010, 22 pages.
U.S. Appl. No. 11/412,417: Notice of Allowance and bibliographic data sheet mailed Jul. 6, 2010, 9 pages.
U.S. Appl. No. 11/412,417: RCE mailed Oct. 5, 2010, 4 pages.
U.S. Appl. No. 11/412,417: Notice of Allowance and bibliographic data sheet mailed Oct. 26, 2010, 4 pages.
U.S. Appl. No. 11/412,417: Issue Fee Payment and Comments on Reasons for Allowance mailed Jan. 26, 2011, 6 pages.
U.S. Appl. No. 11/412,417: Issue Notification mailed Feb. 9, 2011, 1 page.
U.S. Appl. No. 13/030,084: Application filed Feb. 17, 2011, 103 pages.
U.S. Appl. No. 13/030,084: Filing receipt and Notice to File Missing parts mailed Mar. 3, 2011, 6 pages.
U.S. Appl. No. 11/480,094: Notice to File Corrected Application Papers mailed Aug. 2, 2006, 2 pages.
U.S. Appl. No. 11/480,094: Response to Notice to File Corrected Application Papers filed Nov. 2, 2006, 32 pages.
U.S. Appl. No. 11/480,094: Filing Receipt mailed Dec. 7, 2006, 3 pages.
U.S. Appl. No. 11/480,094: Office Action mailed Dec. 15, 2010, 15 pages.
U.S. Appl. No. 11/480,094: Office Action response, mailed May 16, 2011, 29 pages.

* cited by examiner

400

| Binary String | Binary Numeral |
|---|---|
| <0, 1> | $(1\ 0\ 1)_2$ |
| <0, 1, 1> | $(1\ 0\ 1\ 1)_2$ |

| Natural # | View 1 | View 2 |
|---|---|---|
| 0 | λ |  |
| 1 | < > |  |
| 2 | <0> |  |
| 3 | <1> | 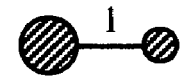 |
| 4 | <0,0> | 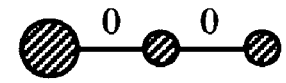 |
| 5 | <0,1> | 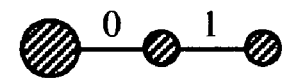 |
| 6 | <1,0> |  |
| 7 | <1,1,> |  |
| 8 | <0,0,0> | 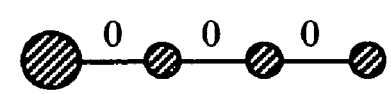 |
*600*
Fig. 6

| Natural # | View 3 |
|---|---|
| 0 |  |
| 1 |  |
| 2 |  |
| 3 |  |
| 4 | 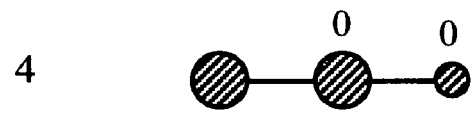 |
| 5 | 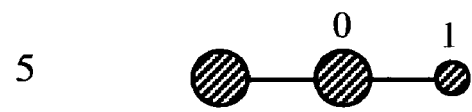 |
| 6 | 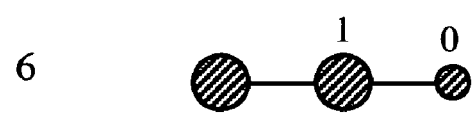 |
| 7 | 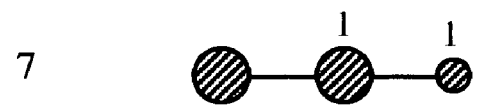 |
| 8 | 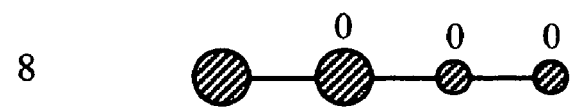 |
Fig. 7

|  | BEL Strings | | BEL Trees |
|---|---|---|---|
| Natural # | View 1 | View 2 | |
| 0 | λ | ○ | ○ |
| 1 | < > | ● | ● |
| 2 | <0> | ●—0—● | ●<br>│0<br>● |
| 3 | <1> | ●—1—● | ●<br>│1<br>● |
| 4 | <0,0> | ●—0—●—0—● | ●<br>0/ \0<br>● ● |
| 5 | <0,1> | ●—0—●—1—● | ●<br>│0<br>●<br>│1<br>● |
| 6 | <1,0> | ●—1—●—0—● | ●<br>1/ \0<br>● ● |

*Fig. 8a*

|  | BEL Strings | | BEL Trees |
|---|---|---|---|
| Natural # | View 1 | View 2 | |
| 7 | <1,1,> | 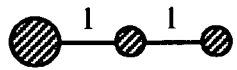 |  |
| 8 | <0,0,0> | 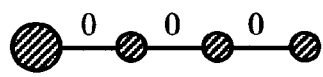 | 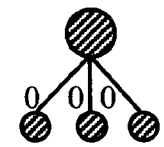 |
| 9 | <0,0,1> | 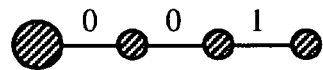 | 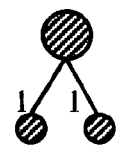 |
| 10 | <0,1,0> | 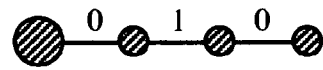 | 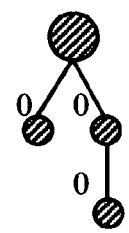 |
| 11 | <0,1,1> | 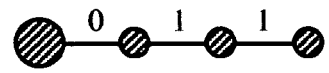 |  |
| 12 | <1,0,0> | 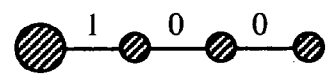 | 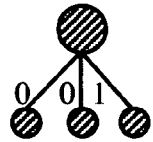 |
800
*Fig. 8b*

BEL Strings                                BEL Trees
| Natural # | View 1 | View 2 | |
|---|---|---|---|
| 13 | <1,0,1> | 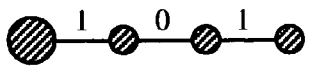 |  |
| 14 | <1,1,0> | 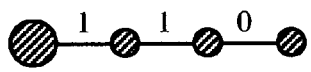 | 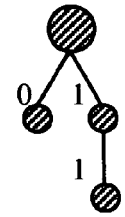 |
| 15 | <1,1,1> | 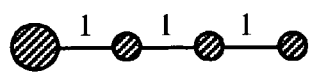 | 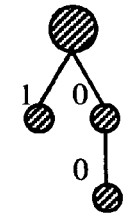 |
| 16 | <0,0,0,0> | 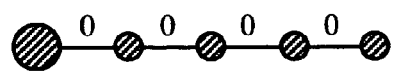 | 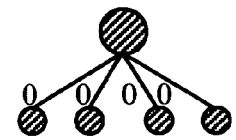 |
| 17 | <0,0,0,1> | 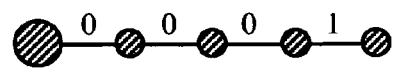 | 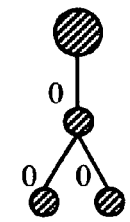 |
| 18 | <0,0,1,0> | 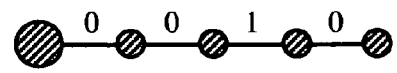 | 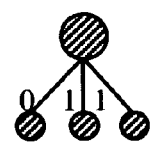 |
800    Fig. 8c

$P(1) = 2$ $P(2) = 3$ $P(3) = 5$ $P(4) = 7$ $\vdots$ $P(2k - 1)$ $P(2k)$ $\vdots$

| Index | Binary Edge-Labelled Strings | Binary Edge-Labelled Trees |
|---|---|---|
| 0. | $\lambda$ [1] | 0 |
| 1. | < > | 1 |
| 2. | < 0 > | $\#_0 11$ |
| 3. | < 1 > | $\#_1 11$ |
| 4. | < 0, 0 > | $\#_0 1 \#_0 11$ |
| 5. | < 0, 1 > | $\#_0 \#_0 111$ |
| 6. | < 1, 0 > | $\#_1 1 \#_0 11$ |
| 7. | < 1, 1 > | $\#_1 \#_0 111$ |
| 8. | < 0, 0, 0 > | $\#_0 1 \#_0 1 \#_0 11$ |
| 9. | < 0, 0, 1 > | $\#_1 1 \#_1 11$ |
| 10. | < 0, 1, 0 > | $\#_0 \#_0 11 \#_0 11$ |
| 11. | < 0, 1, 1 > | $\#_0 \#_1 111$ |
| 12. | < 1, 0, 0 > | $\#_1 1 \#_0 1 \#_0 11$ |
| 13. | < 1, 0, 1 > | $\#_1 \#_1 111$ |
| 14. | < 1, 1, 0 > | $\#_1 \#_0 111 \#_0 11$ |
| 15. | < 1, 1, 1 > | $\#_0 \#_0 11 \#_1 11$ |

[1] The Greek lower-case symbol lambda denotes the empty string.

| | | |
|---|---|---|
| String A  String B | $<1, 0, 0>$ | $<0, 0, 1>$ |
| Binary Numerals | $(1100)_2$ | $(1001)_2$ |
| Product | | $(1101100)_2$ |
| Combination of Strings A and B | | $<1,0,1,1,0,0>$ |

MANIPULATING SETS OF HIERARCHICAL DATA

This disclosure claims priority pursuant to 35 USC §119 (e) from U.S. Provisional Pat. Appl. Ser. No. 60/543,371, filed on Feb. 9, 2004, By J.J. LeTourneau, titled "MANIPULATING SETS OF HIERARCHICAL DATA," assigned to assignee of claimed subject matter.

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 5 is a table illustrating representations of binary strings and binary numerals that may be associated in one particular embodiment;

FIG. 6 is a table illustrating representations of binary strings that may be associated in one particular embodiment;

FIG. 7 is another table illustrating representations binary strings that may be associated in one particular embodiment;

FIGS. 8a, 8b, and 8c are a table illustrating a particular embodiment of an association between binary stings and binary edge labeled trees;

FIG. 9 is a table illustrating a portion of the Kleene enumeration of non-composite numerals;

FIG. 10 is a table illustrating one embodiment of a linear notation for representing a graphical depiction of a hierarchical set of data;

FIG. 23 is a schematic diagram illustrating one embodiment of a technique for combining binary strings.

DETAILED DESCRIPTION

Figure 1:
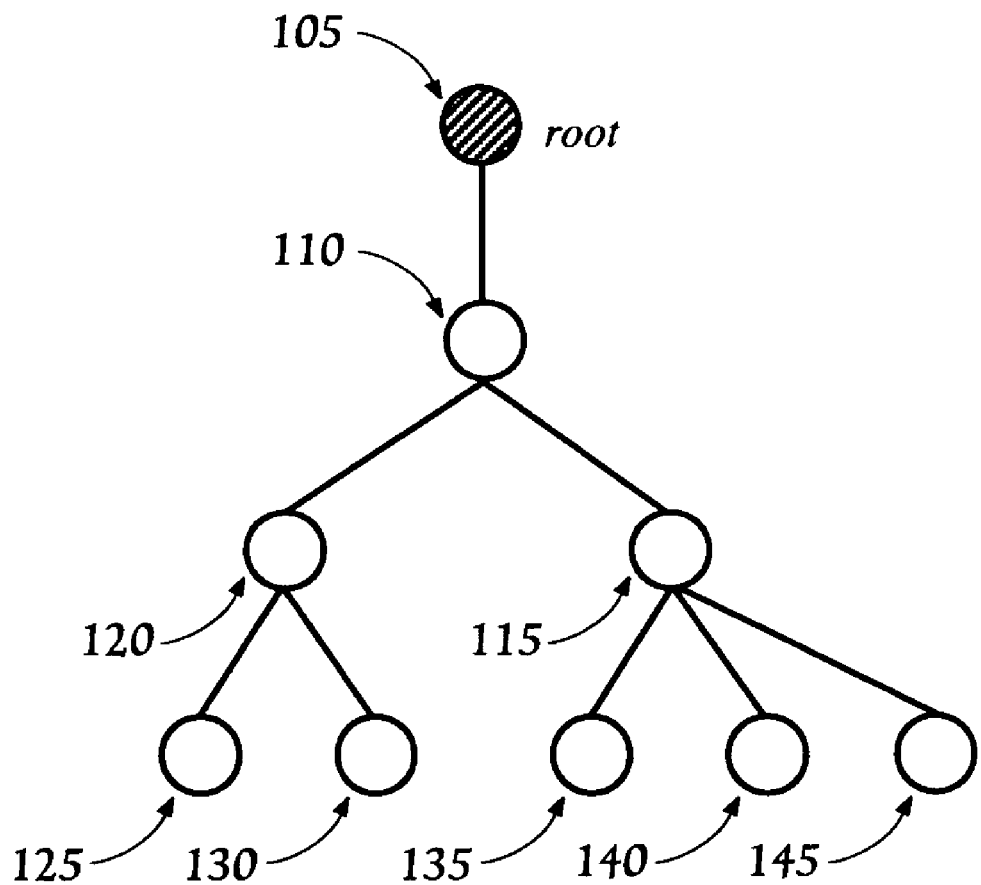
FIG. 1 is a schematic diagram of one embodiment of a tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

In a variety of fields, data or sets of data may be represented in a hierarchical fashion. This form of representation may, for example, convey information, such as particular relationships between particular pieces of data and the like. However, manipulating such data representations is not straight forward, particularly where the data is arranged in a complex hierarchy. Without loss of generality, one example may include a relational data base. Techniques for performing operations on such a data base for example, may be computationally complex or otherwise cumbersome. A continuing need, therefore, exists for additional techniques for manipulating data hierarchies.

As previously discussed, in a variety of fields, it is convenient or desirable to represent data, a set of data and/or other information in a hierarchical fashion. In this context, such a hierarchy of data shall be referred to as a "tree." In a particular embodiment, a tree may comprise a finite, rooted, connected, unordered, acyclic graph. This is illustrated here, for example, in FIG. 1 by embodiment 100. As illustrated, the root of this particular embodiment encompasses node 105. In addition to 105, there are eight other nodes designated 110 to 140, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop. Here, unordered refers to the notion that there is no implied ordering or precedence among nodes attached to a common node, despite the appearance of ordering in a graphical illustration.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data or values may be limited to binary data, that is, in this example, either a binary one or a binary zero. Here, such an embodiment may be referred to as a binary edge labeled tree (BELT), as shall be discussed in more detail hereinafter.

Figure 2:
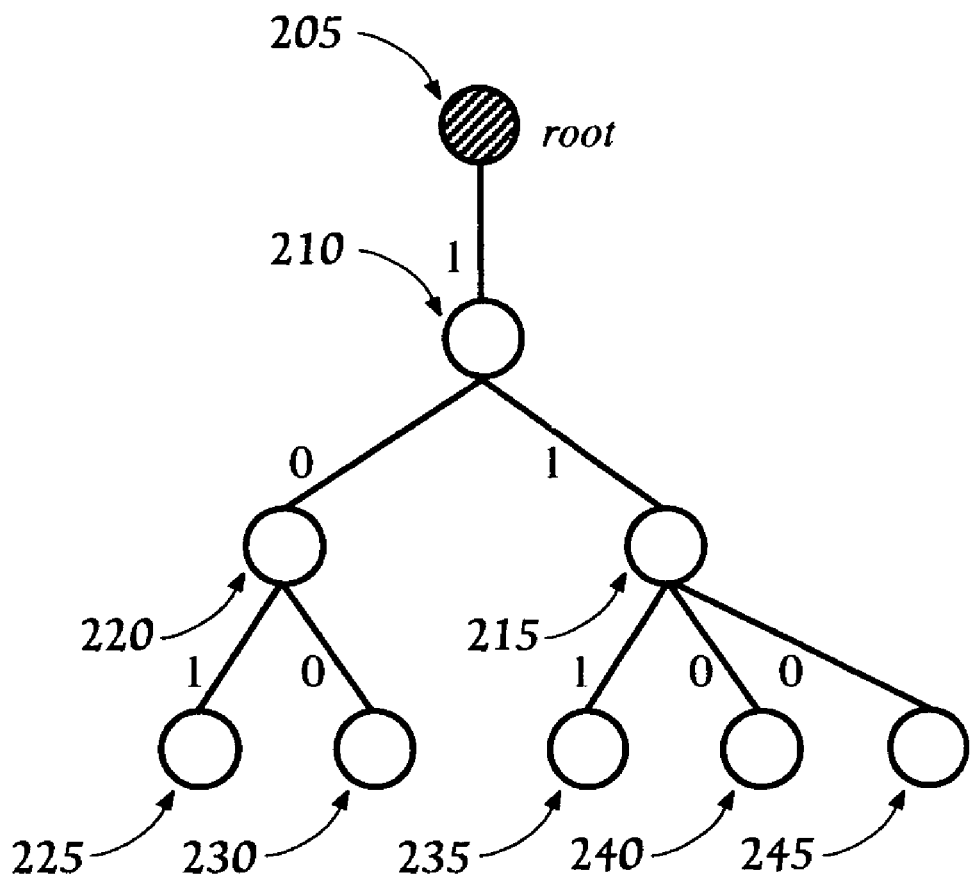
FIG. 2 is a schematic diagram illustrating one embodiment of a binary edge labeled tree.
Figure 3:
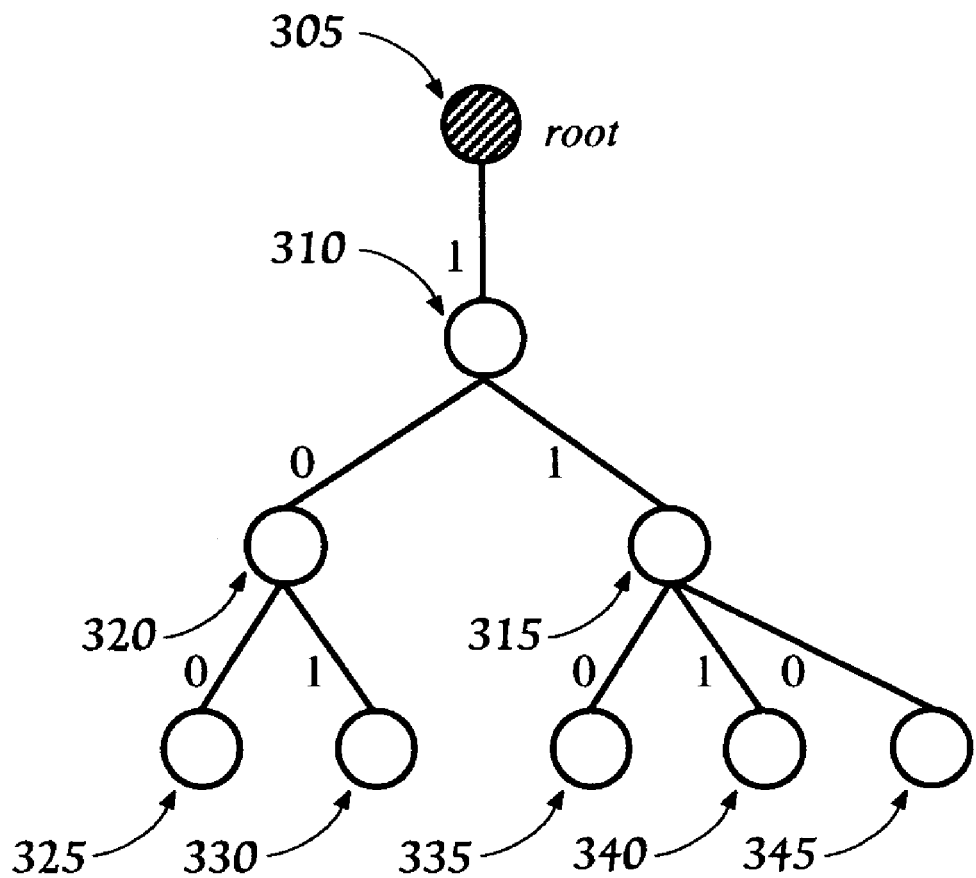
FIG. 3 is a schematic diagram illustrating another embodiment of a binary edge labeled tree.

One example of a BELT is illustrated by embodiment 200 of FIG. 2. Thus, as illustrated, the edges of the BELT shown in FIG. 2 are labeled with either a binary zero or binary one. FIG. 3 illustrates another embodiment 300 of a different binary edge labeled tree. It is noted that this tree is similar or isomorphic to the embodiment of FIG. 2.

Figure 4:
FIG. 4 is a schematic diagram illustrating an embodiment of a binary edge labeled string.

A subset of BELTs may be referred to in this context as binary edge labeled strings (BELSs). One embodiment, 400, is illustrated in FIG. 4. Thus, as illustrated by embodiment 400, this particular binary edge labeled string comprises four nodes and three edges, where the edges are labeled, respectively, binary zero, binary one and binary zero. Thus, a binary edge labeled string comprises a binary edge labeled tree in which each node has no more than two edges. To reiterate, in this context, a string comprises a binary edge labeled string and a tree comprises a binary edge labeled tree if each edge of the string or tree respectively stores a single bit. Likewise, in this context, two nodes are employed to support an edge holding a single piece of binary data. At this point, it is worth noting that strings and trees having nodes and edges, such as previously described, may be represented in a computing platform or similar computing device through a data structure or a similar mechanism intended to capture the hierarchical relationship of the data. It is intended that all such embodiments are included within the scope of the claimed subject matter.

As may be apparent by a comparison of FIG. 4 with, for example, FIG. 2 or FIG. 3, typically a binary edge labeled tree has the ability to be richer and convey more data and/or more information than a binary edge labeled string, although, of course, depending on the particular tree and the particular string, there may be contrary examples, such as where the string is particularly large and the tree is particular small. The aspect of BELTs to be richer in information may be one potential motivation to employ BELTs over BELSs, for example.

Despite the prior observation, as shall be described in more detail hereinafter, an association may be made between any particular binary edge labeled string and a binary edge labeled tree or vice-versa, that is, between any particular binary edge labeled tree and a binary edge labeled string. In particular, as shall be explained in more detail hereinafter, an association may be constructed between binary edge labeled trees and binary edge labeled strings by enumerating in a consecutive order binary edge labeled strings and binary edge labeled trees, respectively, and associating the respectively enumerated strings and trees with natural numerals. Of course, as shall become more clear hereinafter, many embodiments of associations between trees and strings or between trees and natural numerals are possible. It is intended that the claimed subject matter include such embodiments.

In this context, it may be useful to draw a distinction between binary numerals or binary data values and binary strings. FIG. 5, for example, illustrates a binary string and its associated binary numeral or data value. All binary numerals or binary data values may be represented with a binary string, but not vice-versa. One reason for this is that all binary data values or numerals, except the binary data value zero, begin with a binary one, but not so for binary strings. Likewise, there are many different ways to represent binary strings, and the claimed subject matter is not limited to any particular technique to make such a representation. For example, FIG. 6 illustrates two techniques or approaches to viewing essentially or substantially the same binary string.

FIG. 6, therefore, has three columns. Column two contains the conventional or standard method to represent a binary string, such as may be employed in the field of computer science, for example. Along the same row, column three contains a graphical representation of substantially the same binary string using a binary edge labeled string, such as previously described. Likewise, column one, along the same row, contains a natural numeral that corresponds to the particular binary string of the particular row.

However, this particular order of binary strings is not the typical order that is well-known and employed, for example, in technical fields, such as computer science and/or electrical engineering. Typically, for binary numerals, for example, to form the next consecutive binary numeral after one, a binary digit or bit is added to the right. For example, in an ordered sense, the binary numeral following binary numeral one, $(1)_2$, is the binary numeral one zero, $(10)_2$.

In contrast, for the table illustrated in FIG. 6, a binary digit or bit is added to the left; however, a similar convention of adding a binary zero before a binary one is employed. Thus, as one example, the binary string after the binary string, one <1>, is the binary string, zero zero <0,0>. Furthermore, this particular ordering or enumeration of binary strings begins with the string with no nodes, which, for this particular embodiment, is associated with the natural numeral zero and has a symbolic representation here that comprises a lambda (λ). In this context, this may be referred to as the empty binary string or zero node binary edge labeled string. Next in the enumeration is the binary string that comprises a single node and, therefore, holds no data. In this particular embodiment, this is associated with the natural number one, and is depicted by a graphical representation that comprises a single node. This is referred to here as the one node binary string. For higher positive natural numerals, as previously suggested, to represent a single bit for a binary edge labeled string, two nodes are employed.

One technique for converting from a particular binary string, such as in column two, for example, to the natural numerals in column one, includes inserting a binary numeral one in front of the binary string, and then converting the binary numeral one plus the binary digits of the binary string to a binary numeral. The natural numeral, corresponding to that binary numeral by converting from base two to base ten, provides the desired result. Thus, one embodiment of a method of enumerating a set of strings, in this case binary strings, includes positioning, at a location k, where k represents a positive natural numeral, a binary string such that the string comprises the binary numeral corresponding to k with the left most binary digit omitted. Again, as previously suggested and illustrated in FIG. 6, by column three, binary strings may be represented by binary edge labeled strings or BELS, although the claimed subject matter is not limited in scope in this respect.

As alluded to previously, there are many ways to represent binary strings and it is intended to include all such representations within the scope of the claimed subject matter. As simply one example, FIG. 7 illustrates yet another view of a binary string. Column two of FIG. 7 provides particular examples of binary node labeled strings, rather than binary edge labeled strings. Thus, as will be discussed in more detail hereinafter, binary edge labeled strings and binary node labeled strings may comprise nearly interchangeable representations of a binary string, although, again, other representations are also included within the scope of the claimed subject matter.

In addition to enumerating binary strings, which may be accomplished by adding a bit to the left, as previously described, in one embodiment, alternatively, if a set of specific binary strings are provided, those strings may be ordered. An embodiment of a method of ordering, such as for the previously described embodiment, includes proceeding longer strings with shorter strings. However, for ordering strings of the same length, such strings may be ordered by converting to their associated values, as previously described, by adding binary numeral one to the left of the string, and placing the associated values in conventional ascending numerical order.

Just as binary strings may be ordered and/or enumerated, likewise binary edge labeled trees may also be enumerated and/or ordered. This is illustrated, for example, in FIG. 8. In this particular table, two views or representations of binary strings are associated with a particular representation of binary edge labeled trees. It is noted that this particular figure also includes the associated natural numerals. The association of such numerals for this particular embodiment should be clear based at least in part on the prior description.

Thus, for this particular embodiment, although the claimed subject matter is not limited in scope in this respect, a method of enumerating a set of trees begins with enumeration of an empty binary edge labeled tree and a one node binary edge labeled tree, similar to the empty binary string and one node binary string, previously described. Thus, as for binary strings, here, the empty tree is associated with the natural numeral zero and has a symbolic representation as illustrated in FIG. 8a (circle). Likewise, the one node tree, which holds no data, is associated with the natural numeral one and has a graphical representation of a single node. For higher positive natural numbers, however, this embodiment of a method of enumerating a set of trees comprises positioning a tree at location k, k being a positive natural numeral greater than three, where k is the product of u and v, u and v comprising positive natural numerals greater than one, such that the tree is formed by a union of the trees at positions u and v. Likewise, for those locations that are not a product of other natural positive numerals greater than one, that is, for locations that comprise non-composite numerals, denoted here by j, for example, j being a positive natural number greater than one, a tree is positioned at location j such that the tree is formed by finding the first tree in the prior enumeration such that the binary edge labeled tree obtainable from this first tree by attaching a node to the particular tree as a new root node and labeling the edge between the new root node and the prior root node with a binary "0" label is not in the enumeration at some position lower than j; however, if the binary edge labeled tree obtainable from that first tree, as just described, is present in the enumeration with a binary "0" label for the new edge, but not with a binary "1" label, then the tree at position j is that tree with a binary "1" label for the new edge. This may be illustrated, for example in FIG. 8, as described in more detail below.

As illustrated, for this particular embodiment, and as previously described, the empty tree has zero nodes and is associated with the natural numeral zero. Likewise, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, in order to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

Figure 9:
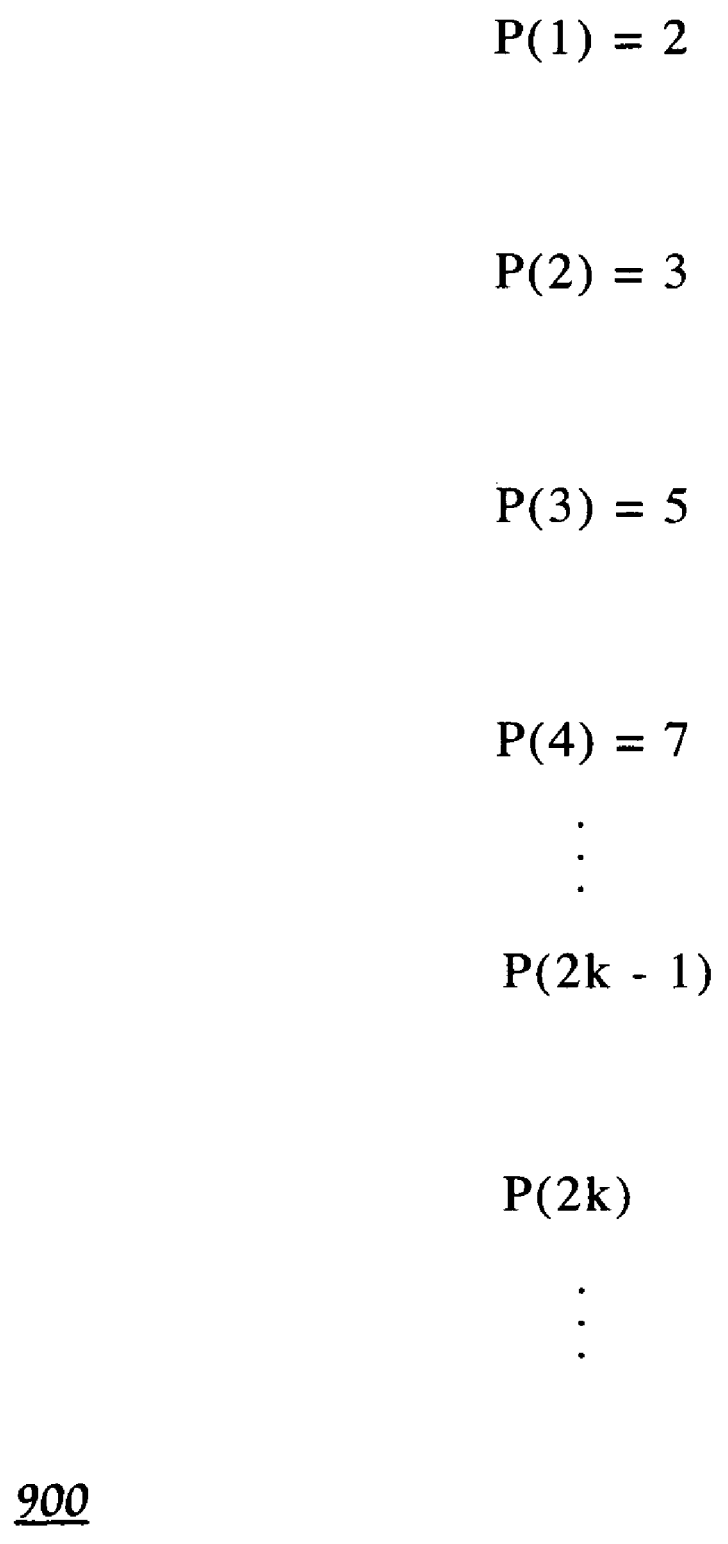

In this context, adding a root node and an edge and labeling it binary zero is referred to as a "zero-push" operation and adding a root node and an edge and labeling it binary one is referred to as a "one-push" operation. Based at least in part on the prior description, for this particular embodiment, it may now be demonstrated that if k is any positive natural numeral and a tree x is positioned at location k, then a non-composite numeral is associated with the zero-push of that tree and a non-composite numeral is associated with the one-push for that tree. Furthermore, the non-composite index of the zero-push of the tree comprises 2k−1, whereas the non-composite index of the one-push of the tree comprises 2k, where the index corresponds to the argument of the well-known Kleene enumeration on positive natural numerals of non-composite numerals, as illustrated, for example, in part in FIG. 9. Thus, referring again to FIG. 8, the one-push of the root tree is the tree at position three. This follows from FIG. 9 since P(2*1)=P(2)=3. Likewise, the tree at position five is the zero-push of the tree at position 2. Again, this follows from FIG. 9 since P(2*2−1)=P(3)=5.

In this context, the approach just described may be referred to as vectorizing non-composite numerals. In the embodiment just described, this was accomplished in pairs, although, of course, the claimed subject matter is not limited in scope in this respect. This may be accomplished in any number of numeral combinations, such as triplets, quadruplets, etc. Thus, using a quadruplet example, it is possible to construct trees such that if k is any positive natural numeral and a tree x is positioned at location k, then a non-composite numeral is associated with the zero-push of that tree, a non-composite numeral is associated with the one-push for that tree, a non-composite numeral is associated with the two-push for that tree, and a non-composite number is associated with the three-push for that tree. Furthermore, the index of the non-composite numeral is such that for a zero-push of the tree, the index comprises (4k−3), for a one-push of a tree, the index comprises (4k−2), for a two-push of a tree, the index comprises (4k−1), and for a three-push of a tree the index comprise (4k), where the index corresponds to the Kleene enumeration of non-composite numerals, P(index), such as provided in FIG. 9.

In the previously described enumeration of binary edged labeled trees, a mechanism may be employed to reduce or convert complex manipulations of hierarchical data to multiplication of natural numerals. For example, if it is desired to combine, or merge at their roots, two trees of hierarchical data, a complex task both computationally and graphically, instead, for this particular embodiment, the two trees may be converted to numerical data by using the previously described association embodiment between binary edge labeled trees and natural numerals. The resulting numerical data from the prior conversion may then be multiplied, and the resulting product may then be converted to a binary edge labeled tree by using a table look up of the previously described association embodiment. It is noted that a subtle distinction may be made between an enumeration embodiment and an association embodiment. Enumeration may comprise listing, in this example, a particular ordered embodiment of BELTs, whereas an association provides a relationship between, in this example, a particular ordered embodiment of BELTs and natural numerals. It is, of course, appreciated that many different enumeration and association embodiments may be employed to execute the operations discussed above and hereinafter, and the claimed subject matter is intended to cover all such enumeration and association embodiments.

Alternatively, a similar approach may be employed to combine two trees using binary strings, rather than numerical data. Thus, using the prior embodiment previously discussed in which particular binary strings and BELTs are associated, the BELTs may be converted to binary strings. The binary strings may be combined, and the resulting combination of strings may then be converted to a tree using the association embodiment, as described, for example, above. It is noted that in this particular context, combining binary strings refers to an operation as illustrated in FIG. 26. The binary strings are converted to binary numerals, such as previously described. The converted binary numerals may be multiplied, and the resulting binary numeral product may then be converted to a binary string, again, as previously described.

Likewise, a process embodiment that is a reversal to the previously described embodiments may also be employed. Thus, complex hierarchies of data may be split or divided, when this is desired. For example, a binary edge labeled tree to be divided may be converted to a piece of numerical data, such as by using the previously described association embodiment. This data may then be factored into two pieces of numerical data whose product produces the previously mentioned piece of numerical data. These two pieces of numerical data may then be converted to trees, again, by using the prior association embodiment, for example.

A similar approach may be employed using binary strings, analogous to the approach described above using binary strings to combine trees. Thus, a tree to be divided may be converted to a binary string using, for example, the previous association embodiment. This string may be split into two separate binary strings and these two separate binary strings may then be converted to two binary edge labeled trees, using the association embodiment previously discussed. Again, to do so, the binary string may be converted to a binary numeral. The binary numeral may then be factored into two binary numerals, and these two binary numerals may be converted to binary strings.

Another form of manipulating hierarchical sets of data may involve ordering or hashing. This may be desirable for any one of a number of different operations to be performed on the sets of data. One approach is similar to the previously described embodiment. For example, it may be desired to order a given set of trees. Doing so may involve converting the trees to numerical data, as previously described, using an association embodiment. The numerical data may then be ordered and the numerical data may then be converted back to binary edge labeled trees using the previously described association embodiment, or an alternate association embodiment, for example.

It is noted that there may be any one of a number of different ways of converting from numerals or numerical data values to a binary edge labeled tree or from a binary string to a binary edge labeled tree, and vice-versa. Nonetheless, a convenient method for doing so with this particular embodiment includes storing a table providing an association embodiment between natural numerals, binary strings and binary edge labeled trees, such as the embodiment previously described. Thus, once it is desired to convert from one to the other, such as from a binary string to a BELT, from a natural number to a BELT, or vice-versa, for example, a table look up operation may be performed using the association embodiment.

Techniques for performing table look ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data may be formed by combining two or more hierarchies of data, such as by applying a previously described embodiment. Likewise, multiple hierarchies of data may be formed by splitting or dividing a particular hierarchy of data, again, such as by applying a previously described embodiment. Likewise, additional operations and/or manipulations of data hierarchies may be performed, such as ordering hierarchies of data and more. It is intended that the claimed subject matter cover such embodiments.

Much of the prior discussion was provided in the context of binary edge labeled trees. Nonetheless, as alluded to previously, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. This is illustrated, for example, in FIG. 7. Thus, rather than employing binary edge labeled trees, the previously described embodiments may alternatively be performed using binary node labeled trees. As one example embodiment, operations and/or manipulations may be employed using binary edge labeled trees and then the resulting binary edge labeled tree may be converted to a binary node labeled tree. However, in another embodiment, operations and/or manipulations may be performed directly using binary node labeled trees where a different association embodiment, that is, in this example, one that employs binary node labeled trees, is employed.

In accordance with the claimed subject matter, therefore, any tree or any string, regardless of whether it is binary edge labeled, binary node labeled, non-binary, a feature tree, or otherwise, may be manipulated and/or operated upon in a manner similar to the approach of the previously described embodiments. Typically, different association embodiments shall be employed, depending at least in part, for example, upon the particular type of tree and/or string. For example, and as shall be described in more detail below in connection with FIG. 11, a node labeled tree in which the nodes are labeled with natural numerals or data values may be converted to a binary edge labeled tree. Furthermore, this may be accomplished with approximately the same amount of storage. For example, for this particular embodiment, this may involve substantially the same amount of node and/or edge data label values.

Figure 11:
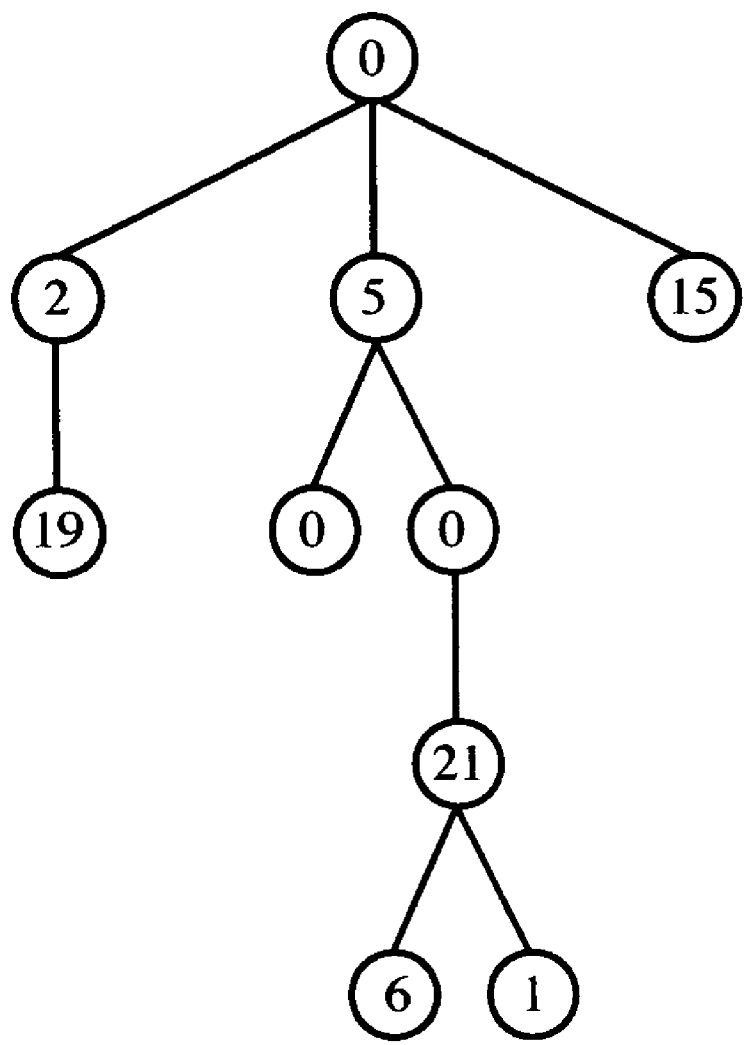
FIG. 11 is a schematic diagram of an embodiment of a node labeled tree.

As previously noted, the claimed subject matter is not limited in scope to this particular example, however, as illustrated in more detail hereinafter, the tree illustrated in FIG. 11 is converted to a binary edge labeled tree through a sequence of processing depicted here as graph operations, although such a conversion may alternatively be implemented by operations implemented otherwise, one such example being a computing platform, for example. Alternatively, it may be desirable, depending upon the particular embodiment, to convert trees to, for example binary node labeled trees. Likewise, other embodiments in which trees of one form are converted to trees of another form are also included within the scope of the claimed subject. However, for this particular embodiment, it will be assumed that the association between trees and strings, such as previously described, is depicted or enumerated in terms of binary edge labeled trees, as previously illustrated, for example. Thus, in this example, a particular tree, embodiment 1100, is illustrated in FIG. 11, comprises a node labeled tree rather than an edge labeled tree.

Figure 12:
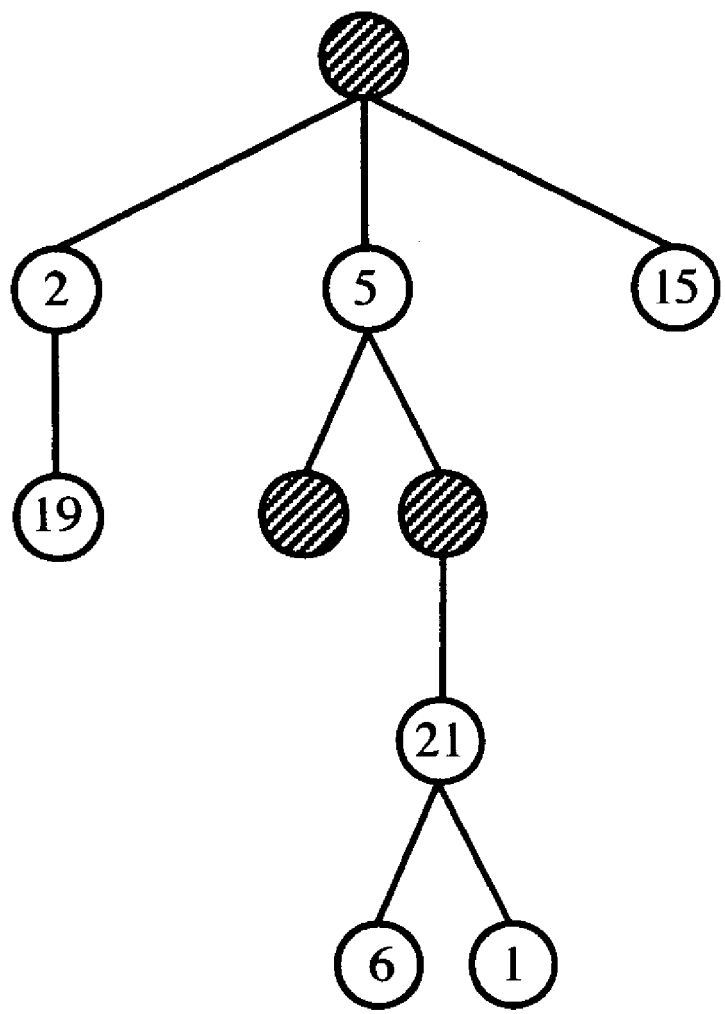
FIGS. 12-17 illustrate application of various operations to convert the embodiment of FIG. 11 from one type of tree to another type of tree.
Figure 13:
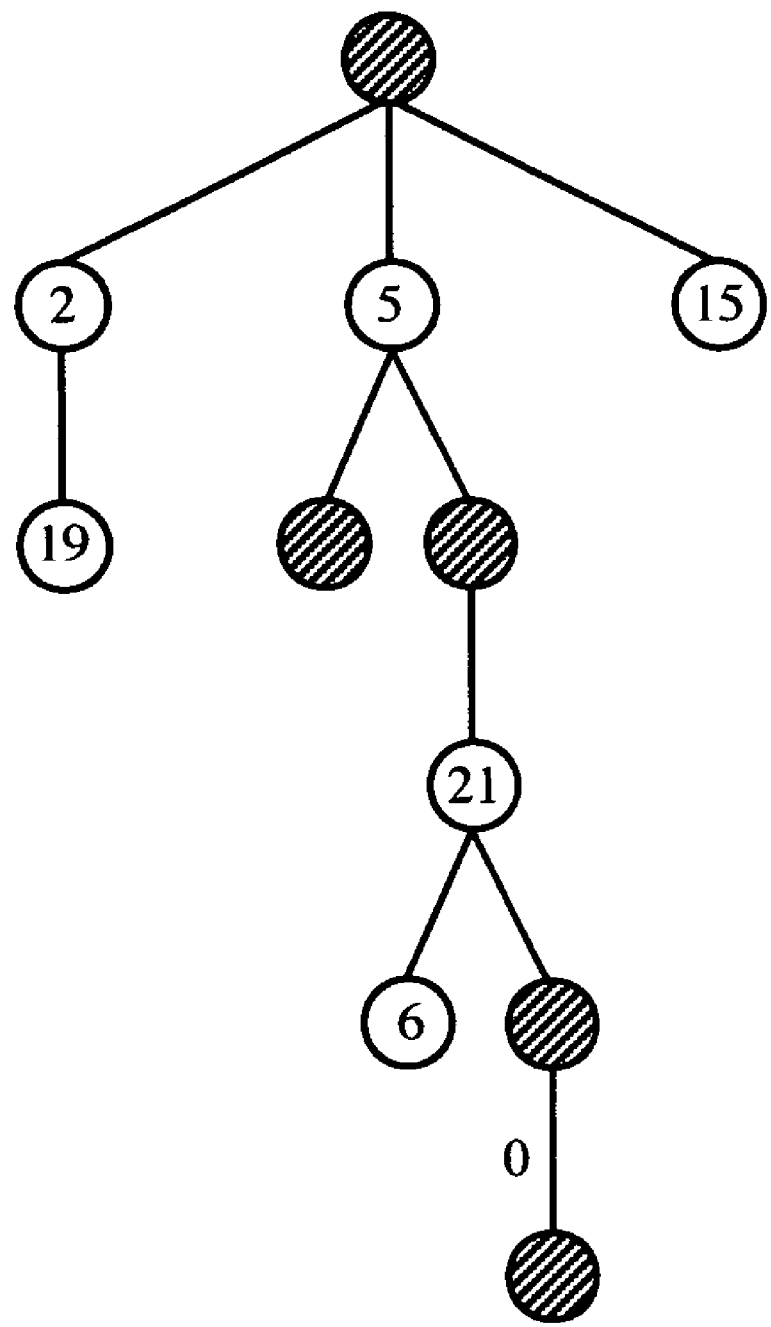
Figure 14:
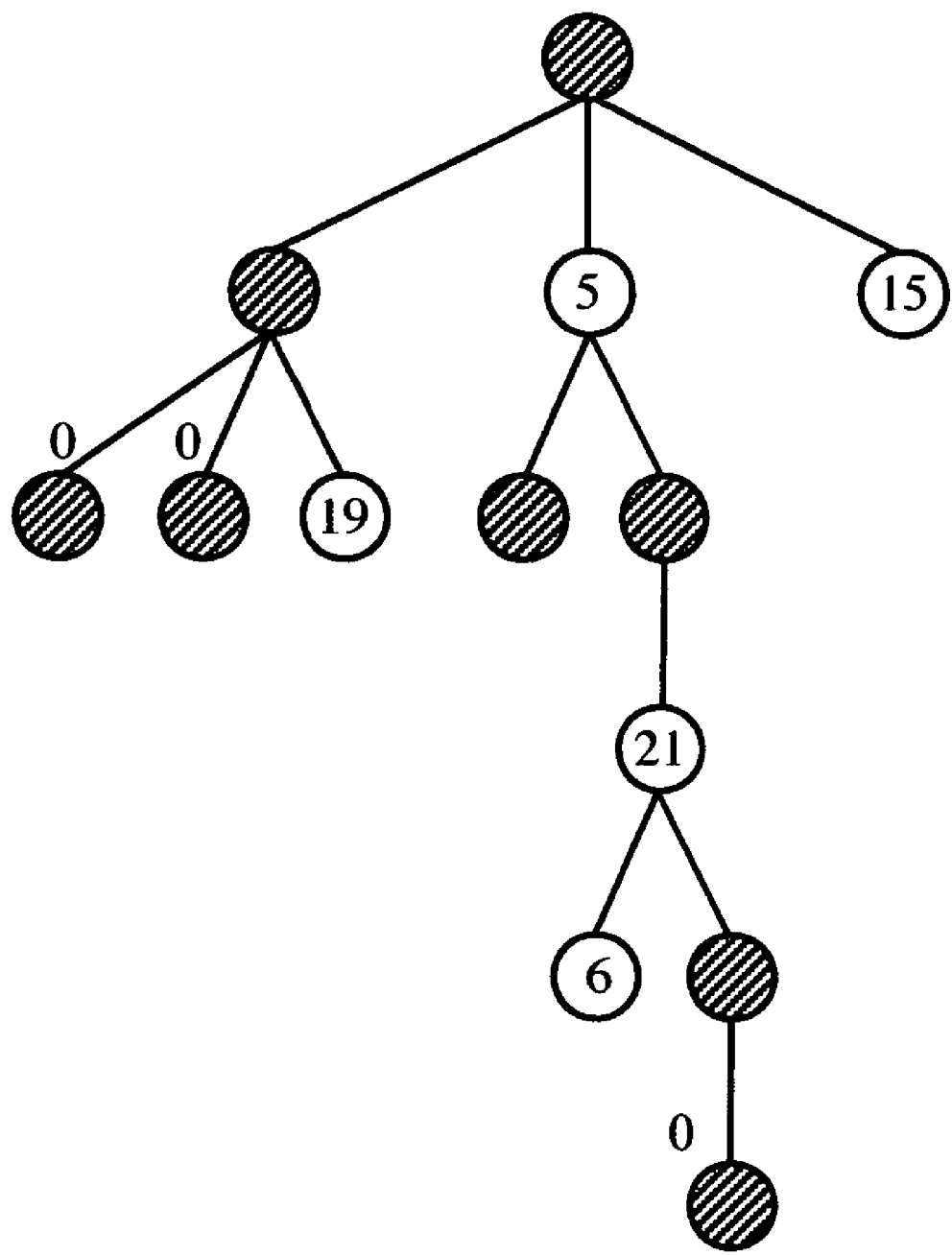

Referring now to FIG. 11, node values are deleted for those nodes storing the value zero. This is illustrated, for example, in FIG. 12. Node values are also deleted for the nodes storing the value one. In this case, a new single unlabeled node is attached to those nodes that had stored the value one, and the edge between the prior node and the new node is labeled with a zero value. This is illustrated, for example, in FIG. 13. For nodes with a value k that is a power of 2, and larger than one, the node value is deleted and ($\log_2(k)+1$) new nodes are attached, labeling the edge between the new nodes and the old nodes with a zero value. This, for example, is illustrated in FIG. 14.

Figure 15:
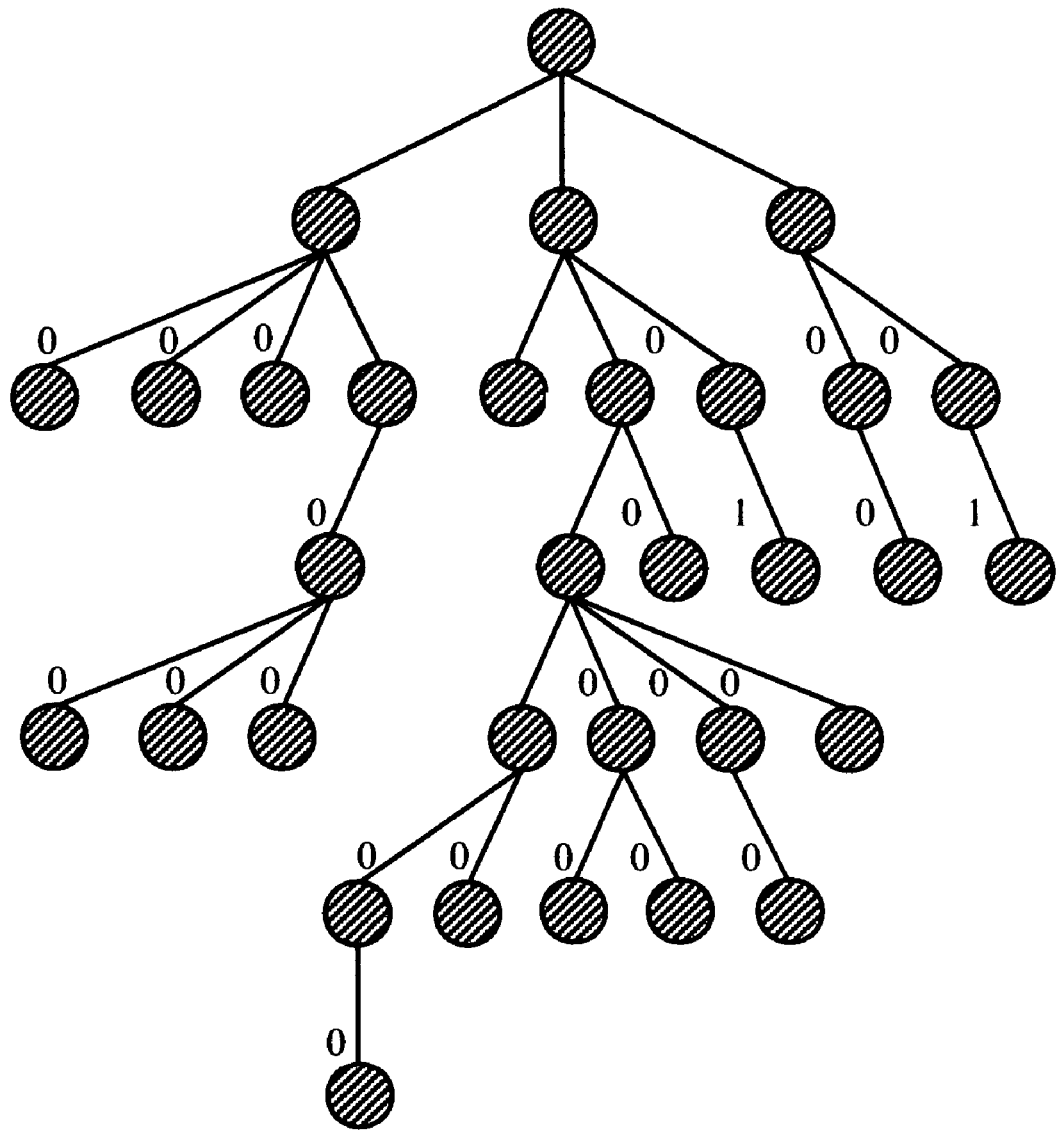
Figure 16:
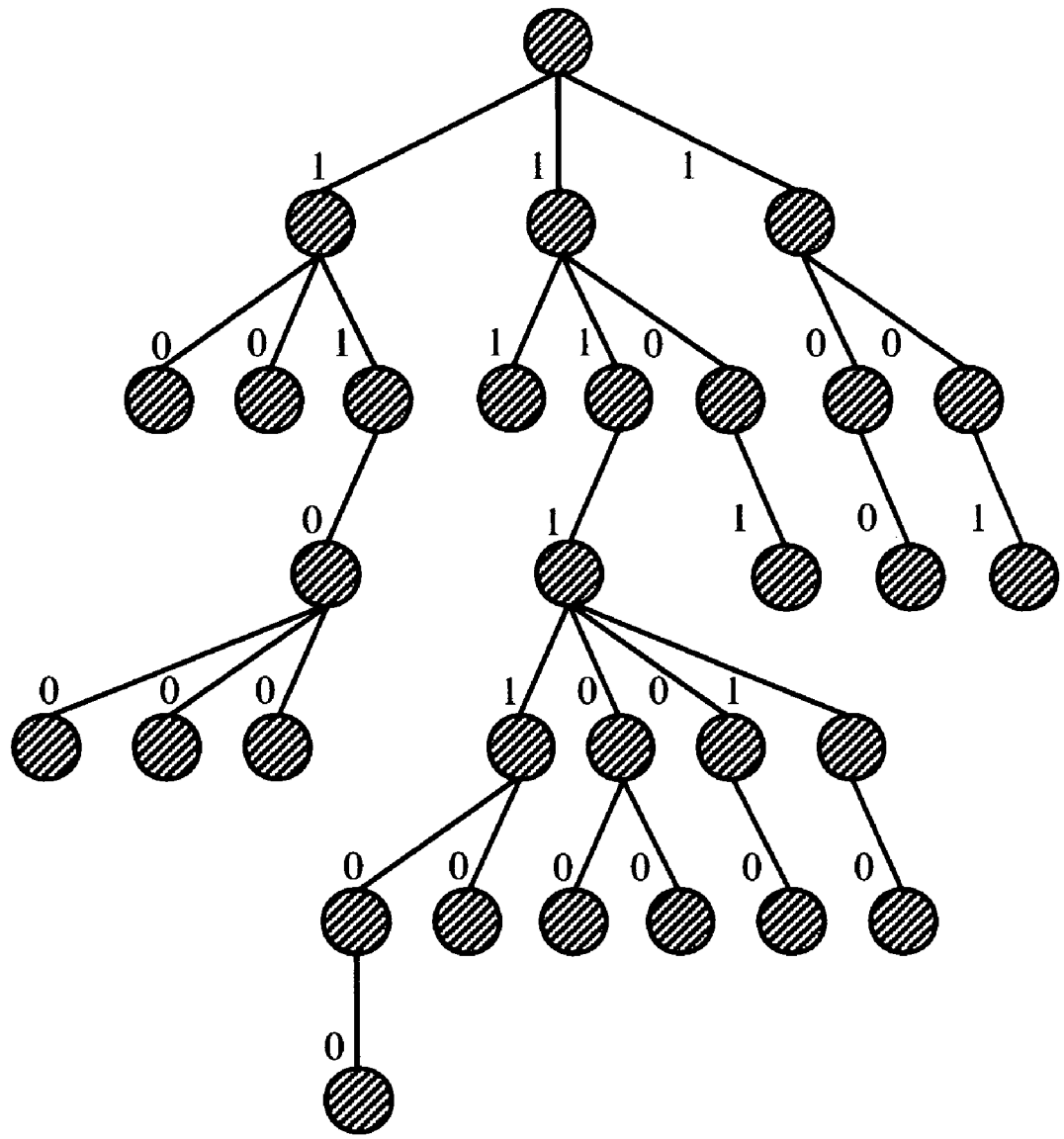

The remaining node values comprise non-powers of two that are 3 or larger. These node values are factored into one or more non-composite numerals. For the resulting non-composite numerals, the non-composite numeral is replaced with the tag value of the index, for example, i, for the non-composite. For this particular embodiment, the term, tag value of index, i, for example, refers to a binary edge labeled tree in the previously discussed embodiment of a string-tree association that corresponds to a binary string associated with the binary numeral for i. The new edges of the tree are labeled with the binary value zero. This is illustrated, for example, in FIG. 15. The remaining edges of the tree are labeled with a binary value of one. This is illustrated in FIG. 16.

Figure 17:
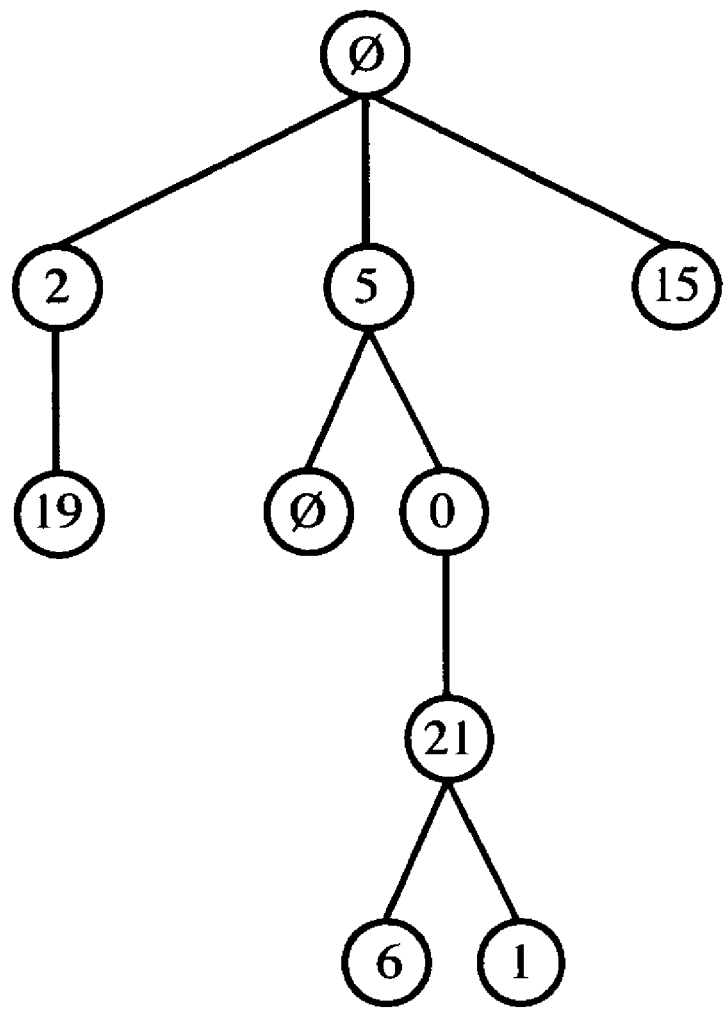

In another embodiment, however, a particular tree may include null types or, more particularly, some node values denoted by the empty set. This is illustrated, for example, by the tree in FIG. 17, although, of course, this is simply one example. An advantage of employing null types includes the ability to address a broader array of hierarchical data sets. For example, without loss of generality and not intending to limit the scope of the claimed subject matter in any way, a null type permits representing in a relational database, as one example, situations where a particular attribute does not exist. As may be appreciated, this is different from a situation, for example, where a particular attribute may take on a numeral value of zero. Thus, it may be desirable to be able to address both situations when representing, operating upon and/or manipulating hierarchical sets of data.

Figure 18:
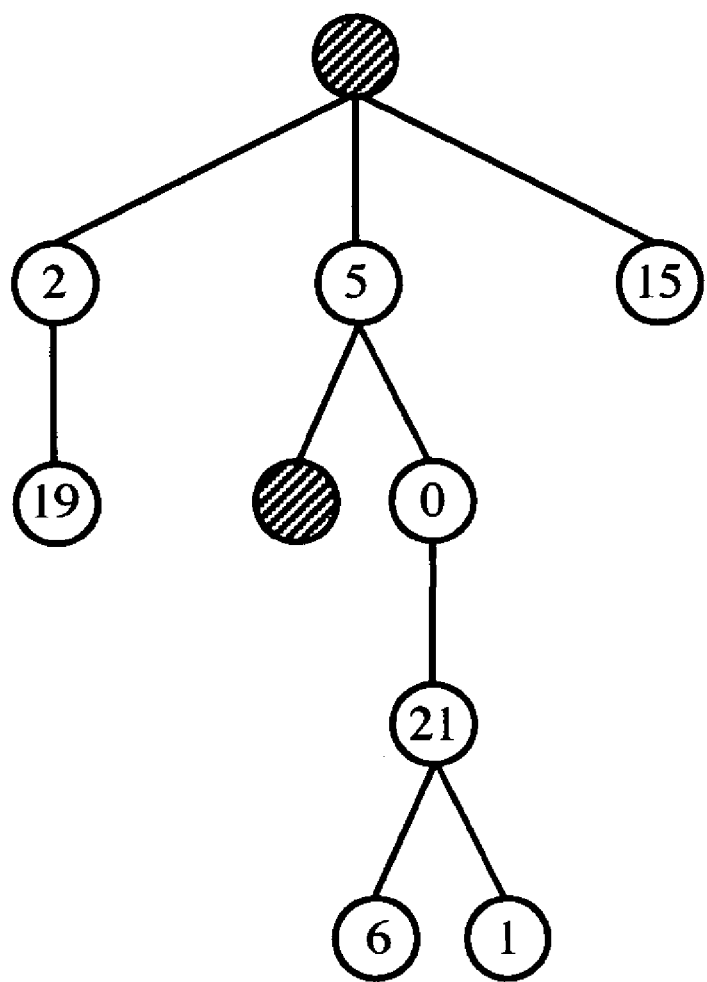
FIG. 18 is a schematic diagram illustrating another embodiment of a node labeled tree.

For this particular embodiment, a tree with nulls, as described above, may be converted to a tree without nulls. This shall be illustrated, for example, for nodes labeled with a null, such as for the tree in FIG. 17; however, the claimed subject matter is not limited in scope in this respect, of course. In this particular embodiment, the nulls are deleted from those nodes having a null. This is illustrated, for example, by FIG. 18.

Figure 19:
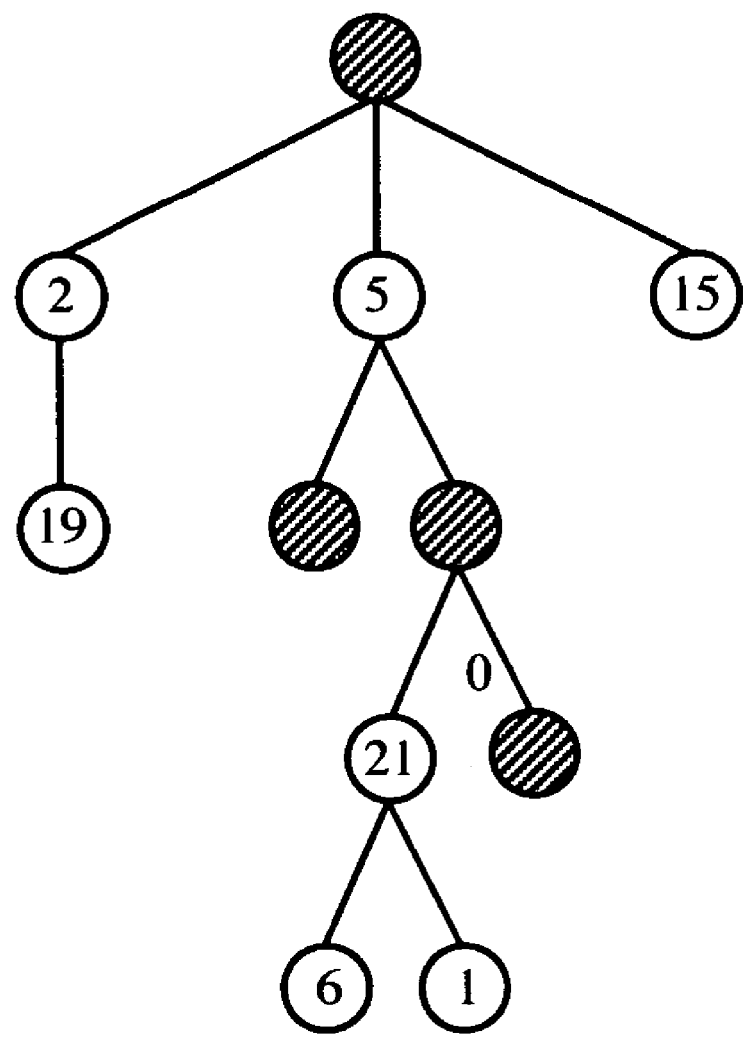
FIGS. 19-22 illustrate application of various operations to convert the embodiment of FIG. 18 from one type of tree to another type of tree.
Figure 20:
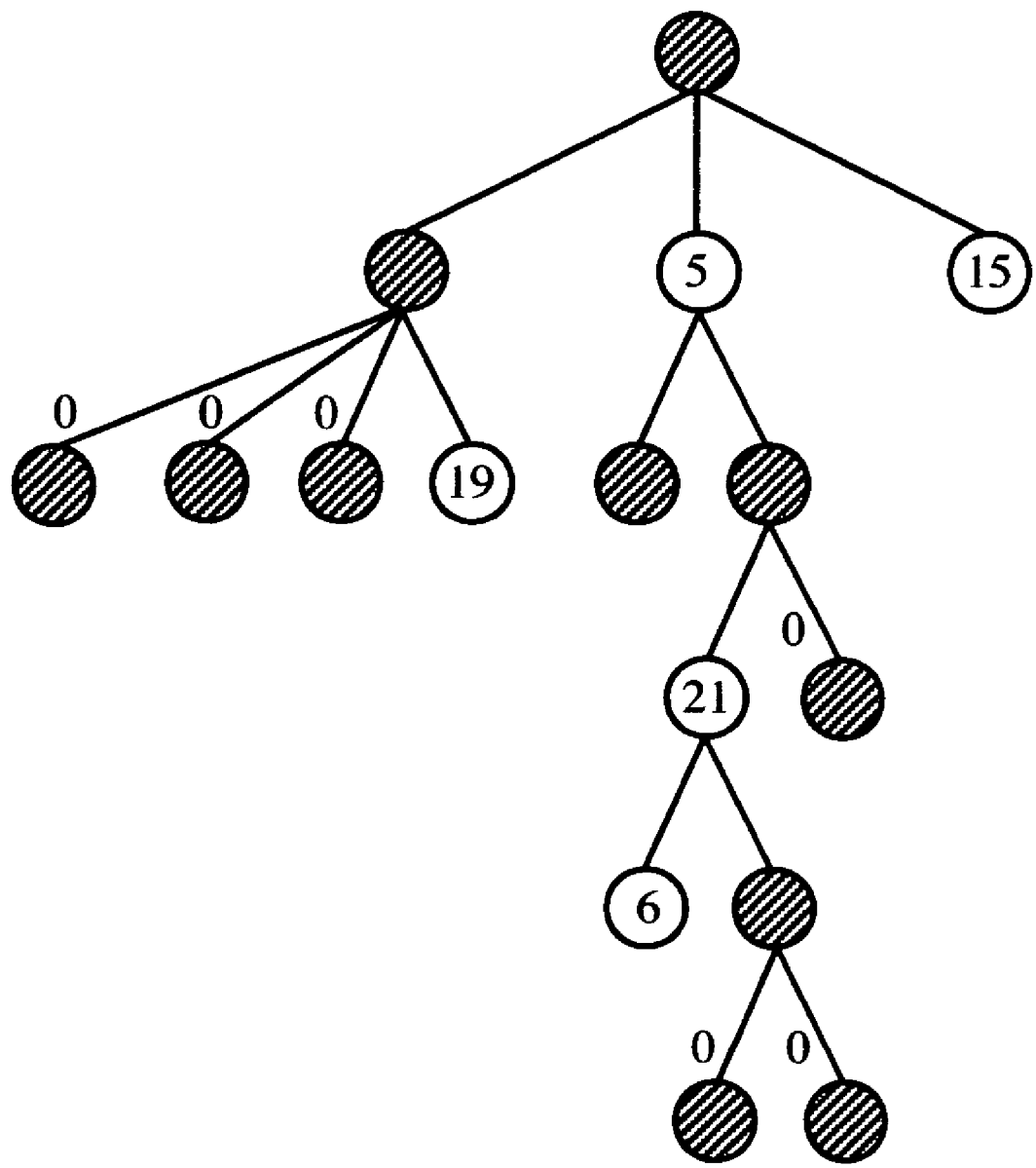

Referring now to FIG. 19, node values are also deleted for those nodes storing the value zero. Furthermore, a single new node is attached to the nodes previously storing the zero values. The edge between the prior nodes and the new nodes are labeled with a zero value. For nodes with a value k that is a power of 2, including the value one, the node value is deleted and ($\log_2(k)+2$) new nodes are attached, labeling the edge between the new nodes and the old nodes with a zero value. This is illustrated, for example, in FIG. 20.

Figure 21:
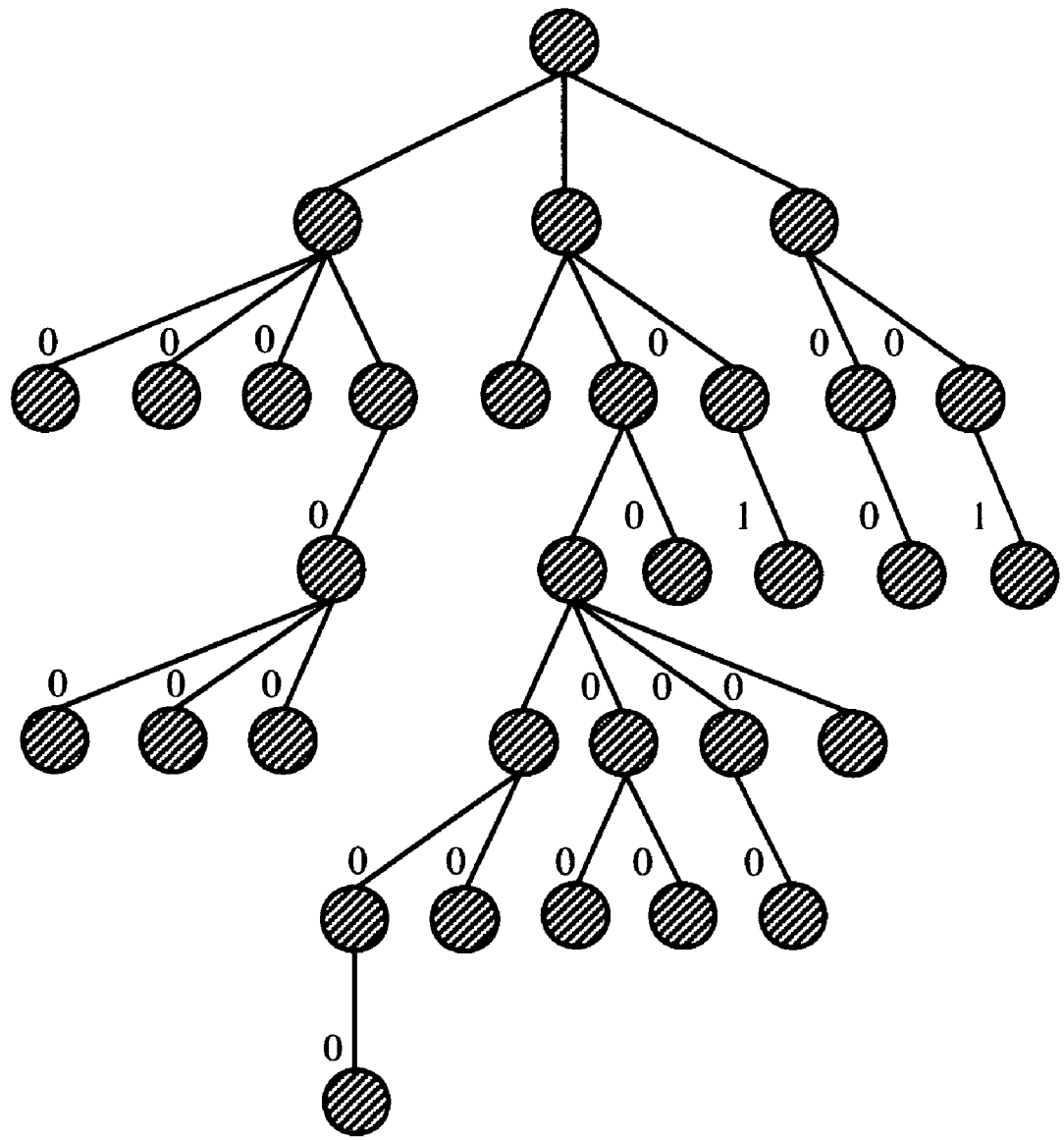
Figure 22:
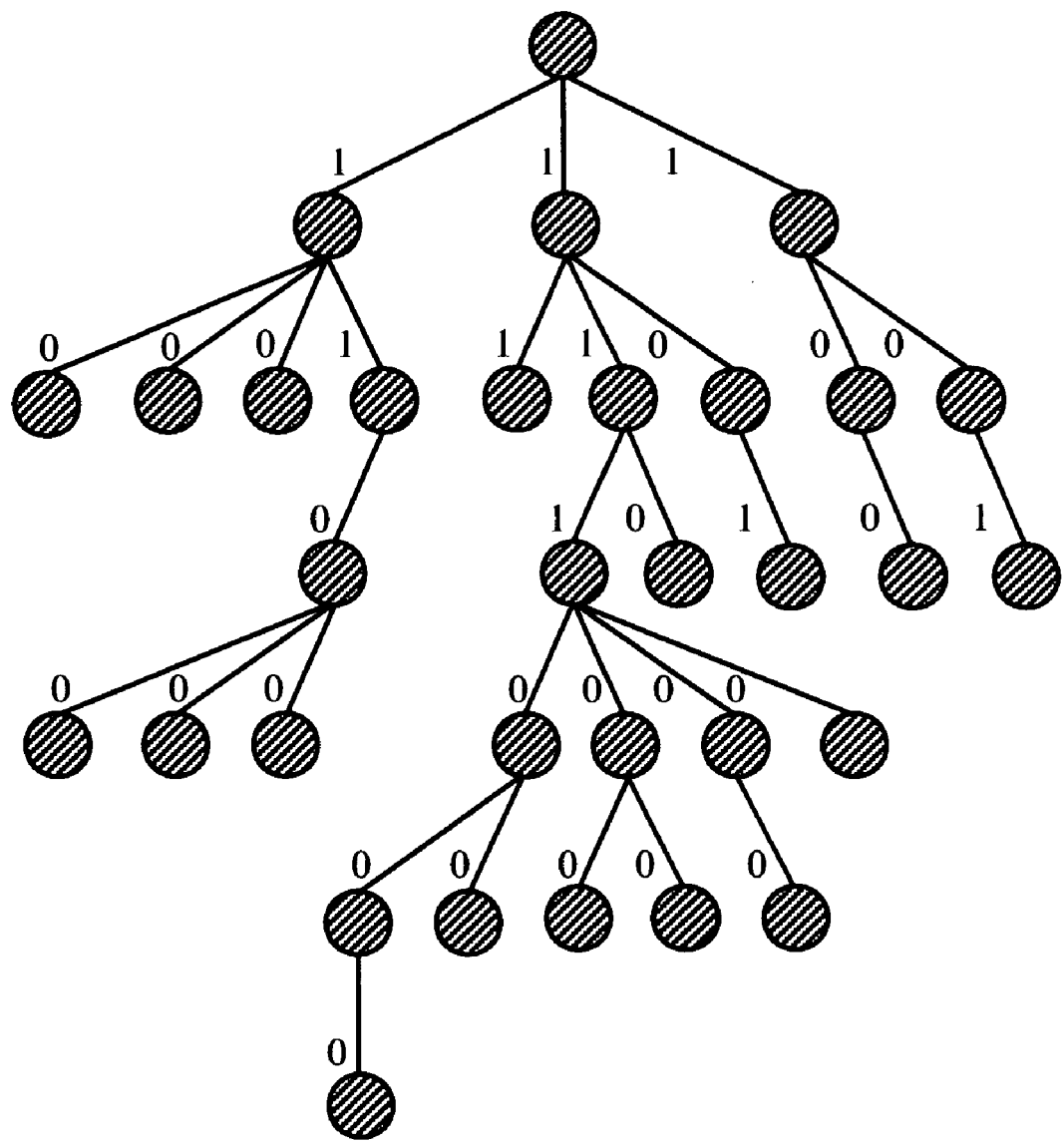

The remaining node values comprise non-powers of two that are 3 or larger. These node values are factored into one or more non-composite numerals. For the resulting non-composite numerals, the non-composite numeral is replaced with the tag value of the index, for example, i, for the non-composite. For this particular embodiment, the term, tag value of index, i, for example, refers to a binary edge labeled tree in the previously discussed embodiment of a string-tree association that corresponds to a binary string associated with the binary numeral for i. The new edges are labeled with a binary value of zero. This is illustrated, for example, in FIG. 21. The remaining edges are labeled with a binary value of one. This tree is illustrated, for example, in FIG. 22.

Likewise, in an alternative embodiment, a node labeled tree may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied. Furthermore, for one embodiment, a tree in which nodes are labeled with numerals or numerical data, rather than binary data, may be converted to a binary edge labeled tree and/or binary node labeled tree, and, for another embodiment, a tree in which edges are labeled with numerals or numerical data, rather than binary data, may be converted to a binary edge labeled tree and/or binary node labeled tree.

Furthermore, a tree in which both the nodes and the edges are labeled may be referred to in this context as a feature tree and may be converted to a binary edge labeled tree and/or binary node labeled tree. For example, without intending to limit the scope of the claimed subject matter, in one approach, a feature tree may be converted by converting any labeled node with its labeled outgoing edge to an ordered pair of labels for the particular node. Using the embodiment described above, this tree may then be converted to a binary edge labeled tree.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to binary edge labeled trees, such as by applying the previously described embodiment, for example.

A similar conversion exists for binary strings. In this context, therefore, depending upon the particular embodiment, for example, binary strings may be depicted as binary edge labeled strings, binary node labeled strings, and the like. Furthermore, for those embodiments in which labels are not binary, for example, a conversion may be made to a binary node labeled string and/or binary edge labeled string, for example. Alternatively, as described previously in connection with trees, depending on the particular embodiment, strings in these alternative forms (e.g., numerals versus binary data) may be manipulated and/or operated upon directly. Thus, in this context, when referring to an embodiment of an association, the association is meant to refer an association between strings and trees, where binary edge labeled strings and binary edge labeled trees are one particular embodiment. Thus, other embodiments may provide a similar type of association, however, such embodiments may alternative use binary node labels and the like. A similar proposition applies for association embodiments between natural numbers and strings and/or between natural numbers and trees. Thus, when referring to an embodiment of an association, the association is meant to refer a particular association between natural numerals and trees or between natural numerals and strings, where here binary edge labeled strings and binary edge labeled trees are one particular embodiment.

As previously described, trees may be employed to graphically represent a hierarchy of data or a hierarchy of a set of data. This has been illustrated in some detail for binary edge labeled trees, for example. As the previous figures, illustrate, however, such graphical hierarchical representations typically employ two spatial dimensions to depict the relationship among different pieces of data. This may be disadvantageous in some situations where a one dimensional representation or arrangement of symbols, such as is employed with alphabetic letters, for example, that are combined to create a linear collection of successive symbols or notations, such as words, would be more convenient.

FIG. 10 is a table that illustrates one particular embodiment of employing symbols, concatenated along one spatial dimension, here from left to right, by convention, to represent such a data hierarchy. The table includes four columns. The first column denotes natural numerals. The second column denotes binary strings, such as those are previously described. The third column denotes a one dimensional arrangement of symbols employed to represent the binary edge labeled trees for that particular position. Of course, as previously described in connection with prior embodiments, the claimed subject matter is not limited in scope to binary strings or binary edge labeled trees. Thus, in alternative embodiments, any tree may be represented with symbols organized in a one dimensional arrangement, as is demonstrated with this particular embodiment.

For this particular embodiment, the symbols are parsed to reduce redundancy of information. For this particular embodiment, the symbols $\#_0$, and $\#_1$ are employed, to represent zero-push and one-push operations, respectively, although, of course, this is merely an embodiment. Any symbols may be employed, including, for example, symbols differentiated by color, symbols differentiated by shape, and the like.

A first symbol, such as for this particular embodiment, a "1," may be employed to represent a node or an edge. For this particular embodiment, "1" represents a node. Additional symbols may be employed, in this particular embodiment, to represent labels of a node or an edge. Again, in this particular embodiment, for binary edge labeled trees, symbols are employed to represent labels of edges. Again, for this particular embodiment, two different labels are employed, a label for a binary one and a different label for a binary zero. Of course, "1" and "0" may be employed and another symbol may be employed to represent nodes in an alternative embodiment. However, using symbols other than "1" and "0" to represent binary one and binary zero reduces confusion with other typical and/or well-known binary numeral schemes.

Here, the linear or successive order of the symbols is employed to represent the graphical hierarchy. Thus, for a labeled edge, the label for that particular edge precedes the symbols that represent the nodes for the particular edge. As one example, consider the representation of the binary edge labeled tree associated with position two. As illustrated by FIG. 10 in comparison with FIG. 8, the label representing binary zero is provided immediately ahead of two adjacent symbols for nodes. The "1" immediately after the label represents the bottom node and the next "1" represents the root node. Thus, the number of "1"s represents the number of nodes for the particular binary edge labeled tree in this particular embodiment. The particular label therefore indicates here that the edge connecting the nodes is labeled binary zero. Likewise, a similar approach is employed for the representation of the tree for position three. Thus, the label of the edge connecting the two nodes comprises a binary one. In contrast, for the position for the binary edge labeled tree of position four, the first symbol represents the binary "0" label and the second symbol represents the bottom node for that edge. The other node for that particular edge is the root node. The symbols are then repeated, representing another edge labeled with a binary zero connected to the root node.

This above may be contrasted with the representation for position five of this association embodiment in which the labels for the edges are immediately adjacent each other and symbols for the nodes associated with the labeled edges are after the two adjacent label symbols. This indicates that the edges are connected to each other, as illustrated by the graphical representation of this particular binary edge labeled tree, rather than each being connected to the root note, as in the prior tree. Of course, the successive edges are then connected to the root node at the top, illustrated by the final "1" at position five. Thus, using this particular embodiment, it is possible to representation all binary edge labeled trees using three symbols going from left to right.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method comprising: executing instructions on a processor to:
   convert electrical digital signals representing at least two edge or node labeled trees to one or more electrical digital signals representing numerals, said numerals being selected from a set of numerals according to a one to one association between edge or node labeled trees and numerals in said set;
   multiply said signals representing said numerals to provide one or more electrical digital signals representing a product of said numerals; and
   convert the one or more signals representing said product to one or more electrical digital signals representing a resulting edge or node labeled tree, wherein said product is a member of said set of numerals associated with said resulting tree according to said association between edge or node labeled trees and numerals, wherein said resulting edge or node labeled tree comprises a combination of said at least two edge or node labeled trees and is stored in memory or displayed in a hierarchical format on a display device.

2. The method of claim 1, wherein said trees comprise binary edge labeled trees.

3. The method of claim 1, wherein said signals representing said at least two trees are converted to one or more electrical digital signals representing binary edge labeled trees.

4. The method of claim 1, wherein at least one of said at least two trees includes at least one null label.

5. The method of claim 4, wherein said at least one of said at least two trees that includes at least one null label is converted to a tree without a null label.

6. The method of claim 5, wherein said tree without a null type is converted to a binary edge labeled tree.

7. The method of claim 1, wherein said signals representing said at least two trees are converted to one or more electrical digital signals representing binary node labeled trees.

8. The method of claim 1, wherein said numerals comprise binary numerals.

9. The method of claim 1, wherein said signals representing said numerals are converted to one or more electrical digital signals representing binary numerals.

10. An apparatus comprising:
    a computing platform; said computing platform comprising one or more processors programmed with instructions executable by said one or more processors to:
    convert electrical digital signals representing at least two edge or node labeled trees to electrical digital signals representing numerals, said numerals being selected from a set of numerals according to a one to one association between edge or node labeled trees and numerals in said set;
    multiply said signals representing said numerals to provide one or more digital signals representing a product of said numerals; and
    convert said signals representing the product of said at least two numerals to one or more signals representing a resulting edge or node labeled tree, wherein said product is a member of said set of numerals associated with said resulting tree according to said association between trees and numerals, wherein said resulting edge or node labeled tree comprises a combination of said at least two edge or node labeled trees and is stored in memory or displayed in a hierarchical format on a display device.

11. The apparatus of claim 10, wherein said at least two trees comprise binary edge labeled trees.

12. The apparatus of claim 10, wherein said one or more processors are further programmed with instructions executable by said one or more processors to convert signals representing said at least two trees to one or more electrical digital signals representing binary edge labeled trees.

13. The apparatus of claim 10, wherein at least one of said at least two trees includes at least one null label.

14. The apparatus of claim 13, wherein said one or more processors is further programmed with instructions executable by said one or more processors to convert said one or more signals representing said at least one of said at least two trees that includes at least one null label to one or more electrical digital signals representing a tree without a null label.

15. The apparatus of claim 14, wherein said one or more processors is further programmed with instructions executable by said one or more processors to convert said one or more signals representing said tree without a null type to one or more electrical digital signals representing a binary edge labeled tree.

16. The apparatus of claim 10, wherein said one or more processors are further programmed with instructions executable by said one or more processors to convert said one or more signals representing said at least two trees to one or more electrical digital signals representing binary node labeled trees.

17. The apparatus of claim 10, wherein said numerals comprise binary numerals.

18. The apparatus of claim 10, wherein said one or more processors is further programmed with instructions executable by said one or more processors to convert said signals representing said numerals to one or more electrical digital signals representing binary numerals.

19. An article comprising:
    a storage medium comprising machine-readable instructions stored thereon executable by a processor to:
    convert one or more electrical digital signals representing at least two edge or node labeled trees to one or more digital signals representing numerals, said numerals being selected from a set of numerals according to a one to one association between edge or node labeled trees and numerals in said set;
    multiply one or more electrical digital signals representing said numerals to provide one or more electrical digital signals representing a product; and
    convert said one or more signals representing the product of said numerals to one or more signals representing a resulting edge or node labeled tree, wherein said product is a member of said set of numerals associated with said resulting tree according to said association between trees and numerals, wherein said resulting edge or node labeled tree comprises a combination of said at least two edge or node labeled trees and is stored in memory or displayed in a hierarchical format on a display device.

20. The article of claim 19, wherein said trees comprise binary edge labeled trees.

21. The article of claim 19, wherein said instructions are further executable by said processor to convert said signals representing said at least two trees to one or more electrical digital signals representing binary edge labeled trees.

22. The article of claim 19, wherein at least one of said at least two trees includes at least one null label.

23. The article of claim 22, wherein said instructions are further executable by said processor to convert said signals representing said at least one of said at least two trees that includes at least one null label to one or more electrical digital signals representing a tree without a null label.

24. The article of claim 23, wherein said instructions are further executable by said processor to convert one or more signals representing said tree without a null type to one or more signals representing a binary edge labeled tree.

25. The article of claim 19, wherein said instructions are further executable by said processor to convert one or more signals representing said at least two trees to one or more signals representing binary node labeled trees.

26. The article of claim 19, wherein said numerals comprise binary numerals.

27. The article of claim 19, wherein said instructions are further executable by said processor to convert said one or more signals representing said numerals to one or more electrical digital signals representing binary numerals.

28. The method of claim 1, wherein said processor comprises a hierarchy manipulation processor programmed with instructions executable to perform tree hierarchy manipulation.

29. The apparatus of claim 10, wherein said one or more processors comprise a hierarchy manipulation processor programmed with instructions executable to perform tree hierarchy manipulation.

30. The article of claim 19, wherein said processor comprises a hierarchy manipulation processor programmed with instructions executable to perform tree hierarchy manipulation.

* * * * *